US010646820B2

(12) United States Patent
Kagawa et al.

(10) Patent No.: US 10,646,820 B2
(45) Date of Patent: May 12, 2020

(54) WET FLUE GAS DESULFURIZATION APPARATUS AND OPERATION METHOD FOR WET FLUE GAS DESULFURIZATION APPARATUS

(71) Applicant: MITSUBISHI HITACHI POWER SYSTEMS, LTD., Yokohama-shi, Kanagawa (JP)

(72) Inventors: Seiji Kagawa, Tokyo (JP); Naoyuki Kamiyama, Tokyo (JP); Takashi Yoshimoto, Tokyo (JP); Tetsu Ushiku, Kanagawa (JP); Satoru Sugita, Kanagawa (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 79 days.

(21) Appl. No.: 15/745,794

(22) PCT Filed: Jul. 15, 2016

(86) PCT No.: PCT/JP2016/071045
§ 371 (c)(1),
(2) Date: Jan. 18, 2018

(87) PCT Pub. No.: WO2017/014200
PCT Pub. Date: Jan. 26, 2017

(65) Prior Publication Data
US 2018/0200667 A1    Jul. 19, 2018

(30) Foreign Application Priority Data
Jul. 23, 2015   (JP) .................................. 2015-145818

(51) Int. Cl.
*B01D 53/14*    (2006.01)
*B01D 53/18*    (2006.01)
(Continued)

(52) U.S. Cl.
CPC .......... *B01D 53/185* (2013.01); *B01D 53/14* (2013.01); *B01D 53/1412* (2013.01);
(Continued)

(58) Field of Classification Search
CPC ........ B01D 2251/404; B01D 2257/302; B01D 2258/0283; B01D 53/14; B01D 53/1412;
(Continued)

(56) References Cited

FOREIGN PATENT DOCUMENTS

| EP | 1 029 579 A1 | 8/2000 |
|---|---|---|
| JP | 62-262728 A | 11/1987 |

(Continued)

OTHER PUBLICATIONS

Machine translation of JP-2009006245-A (Year: 2019).*
(Continued)

*Primary Examiner* — Cabrena Holecek
(74) *Attorney, Agent, or Firm* — Westerman, Hattori, Daniels & Adrian, LLP

(57) ABSTRACT

Flue gas generated when fuel is subjected to combustion by a combustor such as a boiler is supplied, and a sulfur oxide is reduced or removed from the supplied flue gas. A desulfurization apparatus 10A includes an absorber 11, a gas introduction unit 13a, an absorbent jetting unit 15, a plurality of water flow oxidation devices 20, an absorbent supplying unit 25, a demister 30, a gas discharging unit 13b, and a control device 40 that varies the number of water flow oxidation devices 20 that jet absorbent 14 and air 21 based on a rate of the sulfur compound in the absorbent 14 within an absorbent storage tank 11A.

10 Claims, 19 Drawing Sheets

(51) Int. Cl.
  *B01D 53/50*  (2006.01)
  *B01D 53/80*  (2006.01)
  *B01D 53/78*  (2006.01)
  *B01D 53/30*  (2006.01)
  *B01D 53/79*  (2006.01)
  *B01D 53/34*  (2006.01)

(52) U.S. Cl.
  CPC ......... *B01D 53/1481* (2013.01); *B01D 53/18* (2013.01); *B01D 53/30* (2013.01); *B01D 53/346* (2013.01); *B01D 53/50* (2013.01); *B01D 53/504* (2013.01); *B01D 53/78* (2013.01); *B01D 53/79* (2013.01); *B01D 53/80* (2013.01); *B01D 2251/404* (2013.01); *B01D 2257/302* (2013.01); *B01D 2258/0283* (2013.01)

(58) Field of Classification Search
  CPC .. B01D 53/1481; B01D 53/18; B01D 53/185; B01D 53/30; B01D 53/346; B01D 53/50; B01D 53/504; B01D 53/78; B01D 53/79; B01D 53/80
  See application file for complete search history.

(56) References Cited

FOREIGN PATENT DOCUMENTS

| | | |
|---|---|---|
| JP | H06-091940 B2 | 11/1994 |
| JP | 8-950 A | 1/1996 |
| JP | H09-327616 A | 12/1997 |
| JP | 11-104448 A | 4/1999 |
| JP | 11104448 A * | 4/1999 |
| JP | 2007-7612 A | 1/2007 |
| JP | 2009-6245 A | 1/2009 |
| JP | 2009006245 A * | 1/2009 |
| JP | 2009-172541 A | 8/2009 |

OTHER PUBLICATIONS

Machine translation of JP-11104448-A (Year: 2019).*
International Search Report dated Sep. 6, 2016, issued in Counterpart of International Application No. PCT/JP2016/071045, with English translation (6 pages).
Written Opinion dated Sep. 6, 2016, issued in counterpart Application No. PCT/JP2016/071045, with English translation (12 pages).
International Search Report dated Sep. 6, 2016, issued in counterpart of International Application No. PCT/JP2016/071045 (2 pages).
Extended (Supplementary) European Search Report dated Jun. 5, 2018, issued in counterpart application No. 16827760.6. (7 pages).

* cited by examiner

FIG.4

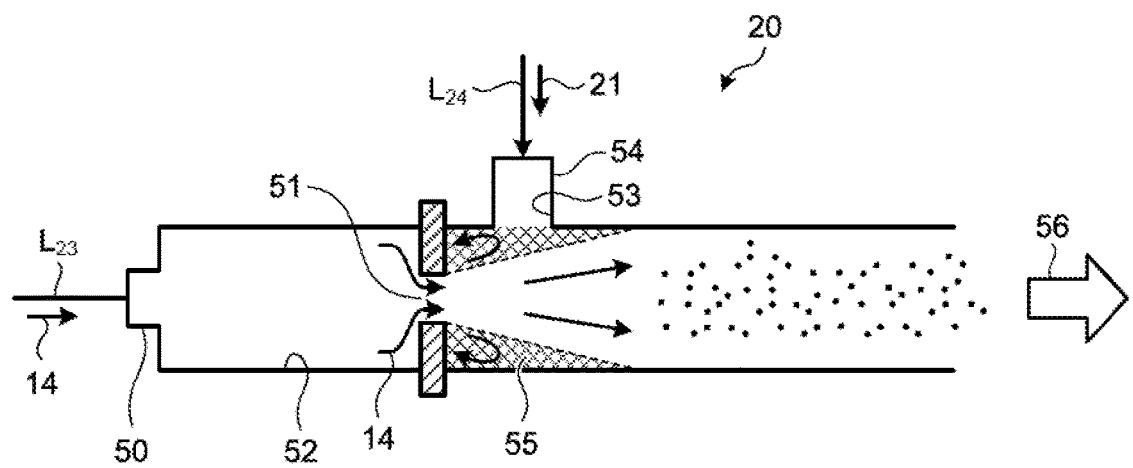

FIG.5

| VALVE | BASIC PLAN OPERATION (100% LOAD OPERATION) | LOW LOAD OPERATION (1) VALVE (ON/OFF) | LOW LOAD OPERATION (2) VALVE ADJUSTMENT |
|---|---|---|---|
| No.1($V_{1-1}$) | 100 (FULLY OPENED) | 100 (FULLY OPENED) | 100 (FULLY OPENED) |
| No.2($V_{1-2}$) | 100 (FULLY OPENED) | -(FULLY CLOSED) | 50 (HALF-OPENED) |
| No.3($V_{1-3}$) | 100 (FULLY OPENED) | 100 (FULLY OPENED) | 100 (FULLY OPENED) |
| No.4($V_{1-4}$) | 100 (FULLY OPENED) | -(FULLY CLOSED) | 50 (HALF-OPENED) |
| No.5($V_{1-5}$) | 100 (FULLY OPENED) | 100 (FULLY OPENED) | 100 (FULLY OPENED) |
| No.6($V_{1-6}$) | 100 (FULLY OPENED) | -(FULLY CLOSED) | 50 (HALF-OPENED) |

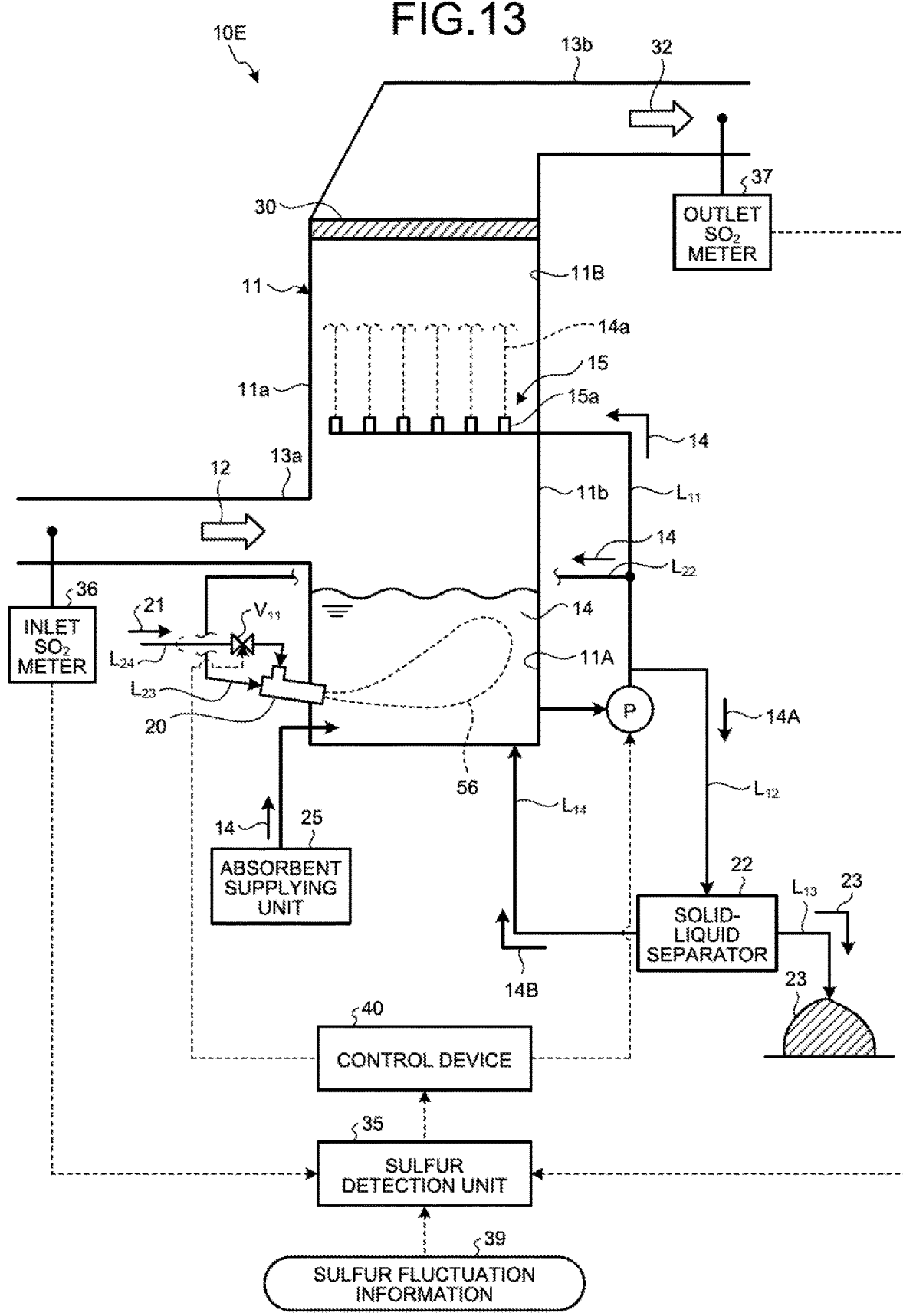

FIG.20

| AIR VALVE | BASIC PLAN OPERATION (100% LOAD OPERATION) | LOW LOAD OPERATION (1) VALVE (ON/OFF) | LOW LOAD OPERATION (2) VALVE ADJUSTMENT |
|---|---|---|---|
| No.1($V_{11-1}$) | 100 (FULLY OPENED) | 100 (FULLY OPENED) | 100 (FULLY OPENED) |
| No.2($V_{11-2}$) | 100 (FULLY OPENED) | -(FULLY CLOSED) | 50 (HALF-OPENED) |
| No.3($V_{11-3}$) | 100 (FULLY OPENED) | 100 (FULLY OPENED) | 100 (FULLY OPENED) |
| No.4($V_{11-4}$) | 100 (FULLY OPENED) | -(FULLY CLOSED) | 50 (HALF-OPENED) |
| No.5($V_{11-5}$) | 100 (FULLY OPENED) | 100 (FULLY OPENED) | 100 (FULLY OPENED) |
| No.6($V_{11-6}$) | 100 (FULLY OPENED) | -(FULLY CLOSED) | 50 (HALF-OPENED) |

FIG.21

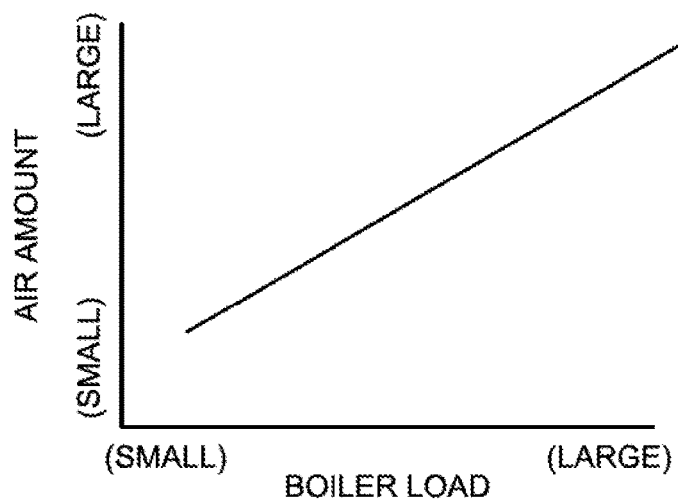

FIG.22A

| VALVE | BASIC PLAN OPERATION (100% LOAD OPERATION) | LOW LOAD OPERATION (1) VALVE (ON/OFF) |
|---|---|---|
| No.1($V_{1\text{-}1}$) | 100 (FULLY OPENED) | 100 (FULLY OPENED) |
| No.2($V_{1\text{-}2}$) | 100 (FULLY OPENED) | -(FULLY CLOSED) |
| No.3($V_{1\text{-}3}$) | 100 (FULLY OPENED) | 100 (FULLY OPENED) |
| No.4($V_{1\text{-}4}$) | 100 (FULLY OPENED) | -(FULLY CLOSED) |
| No.5($V_{1\text{-}5}$) | 100 (FULLY OPENED) | 100 (FULLY OPENED) |
| No.6($V_{1\text{-}6}$) | 100 (FULLY OPENED) | -(FULLY CLOSED) |

FIG.22B

| AIR VALVE | BASIC PLAN OPERATION (100% LOAD OPERATION) | LOW LOAD OPERATION (1) VALVE (ON/OFF) | LOW LOAD OPERATION (3) VALVE (ON/OFF) |
|---|---|---|---|
| No.1($V_{11\text{-}1}$) | 100 (FULLY OPENED) | 100 (FULLY OPENED) | 100 (FULLY OPENED) |
| No.2($V_{11\text{-}2}$) | 100 (FULLY OPENED) | INTRODUCTION OF AIR IS STOPPED | INTRODUCTION OF AIR IS STOPPED |
| No.3($V_{11\text{-}3}$) | 100 (FULLY OPENED) | 100 (FULLY OPENED) | INTRODUCTION OF AIR IS STOPPED |
| No.4($V_{11\text{-}4}$) | 100 (FULLY OPENED) | INTRODUCTION OF AIR IS STOPPED | INTRODUCTION OF AIR IS STOPPED |
| No.5($V_{11\text{-}5}$) | 100 (FULLY OPENED) | 100 (FULLY OPENED) | 100 (FULLY OPENED) |
| No.6($V_{11\text{-}6}$) | 100 (FULLY OPENED) | INTRODUCTION OF AIR IS STOPPED | INTRODUCTION OF AIR IS STOPPED |

WET FLUE GAS DESULFURIZATION APPARATUS AND OPERATION METHOD FOR WET FLUE GAS DESULFURIZATION APPARATUS

FIELD

The present invention relates to a wet flue gas desulfurization apparatus and an operation method for a wet flue gas desulfurization apparatus.

BACKGROUND

For example, desulfurization facilities are installed in a thermal power station and the like for removing sulfur oxides in flue gas generated when fuel oil, coal, and the like are subjected to combustion using a combustor. Examples of the desulfurization facilities include a wet flue gas desulfurization apparatus that brings flue gas into contact with an absorbent (liquid including a calcium compound such as limestone) in an absorber to absorb sulfur oxides in the flue gas into the absorbent, and generates gypsum as a by-product by oxidizing the absorbent after being brought into contact with the flue gas and performing solid-liquid separation.

In this wet flue gas desulfurization apparatus, a sulfur dioxide ($SO_2$) as a sulfur compound (hereinafter, also referred to as "S-containing compound") in the flue gas to be introduced is brought into contact with the absorbent to transfer the $SO_2$ to the absorbent, and the flue gas is cleaned. The $SO_2$ transferred to the absorbent becomes a sulfite ion in the absorbent.

The wet flue gas desulfurization apparatus introduces air into the absorbent, oxidizes the sulfite ion in the absorbent into a sulfate ion, processes the sulfate ion in the absorbent thereafter, and collects the processed sulfate ion as gypsum, for example. In the wet flue gas desulfurization apparatus, as a device for supplying air for oxidation into a tank, used is a water flow oxidation device that supplies the absorbent and air to an absorbent storage tank that stores the absorbent.

As this water flow oxidation device, developed is a gas-liquid mixing device that performs oxidation and stirring within the absorbent storage tank using jetting water streams jetted from a plurality of jet air spargers (JASs) (Patent Literature 1).

CITATION LIST

Patent Literature

Patent Literature 1: Japanese Laid-open Patent Publication No. 2009-6245

SUMMARY

Technical Problem

In the wet flue gas desulfurization apparatus including the water flow oxidation device disclosed in Patent Literature 1, $SO_2$ concentration in flue gas and an amount of the flue gas to be introduced vary. For example, when an operation load is small such as a case of operation at night, the $SO_2$ concentration in the flue gas is lower than a condition of a basic plan of the original design. In such a case, if the wet flue gas desulfurization apparatus is operated similarly to a case of normal operation, oxygen may be supplied more than necessary from the water flow oxidation device (peroxidation state). In the peroxidation state, a refractory peroxide (for example, tetravalent selenium becomes hexavalent selenium) is disadvantageously generated.

The present invention has been made in view of such a situation, and provides a wet flue gas desulfurization apparatus that can be efficiently operated while keeping desulfurization performance, and an operation method for the wet flue gas desulfurization apparatus.

Solution to Problem

A wet flue gas desulfurization apparatus according to at least one embodiment of the invention is configured to include an absorber that includes an absorbent storage tank for storing absorbent and a flue gas passage through which flue gas discharged from a combustor passes, the absorber bringing the flue gas into contact with the absorbent to cause the absorbent to absorb a sulfur oxide included in the flue gas, a gas introduction unit that is arranged on an upper side wall of the absorber, and introduces the flue gas into the absorber, an absorbent jetting unit that is arranged in the flue gas passage and jets the absorbent into a space of the absorber, an absorbent circulation line that supplies the absorbent to the absorbent jetting unit from the absorbent storage tank, a plurality of water flow oxidation devices that jet part of the absorbent branched and introduced from the absorbent circulation line into an inside of the absorbent storage tank together with air, and a control device that adjusts any one or both of a jetting amount of the absorbent jetted from the water flow oxidation device and a supply amount of the air supplied to the water flow oxidation device based on any one or both of a rate of a sulfur compound included in the flue gas and a rate of a sulfur compound in the absorbent within the absorbent storage tank.

With the configuration described above, by adjusting any one or both of the jetting amount of the absorbent jetted from the water flow oxidation device and the supply amount of the air supplied to the water flow oxidation device on the basis of any one or both of the rate of the sulfur compound included in the flue gas and the rate of the sulfur compound in the absorbent in the absorbent storage tank, an amount of air to be introduced into the absorbent storage tank can be reduced, and an oxygen excessive state can be prevented.

In some embodiments with the configuration described above, the control device is configured to execute any one or both of control for varying the number of operations of the water flow oxidation devices and control for varying a circulation amount of the absorbent circulated into the water flow oxidation device.

With the configuration described above, by executing any one or both of control for varying the number of operating water flow oxidation devices and control for varying the circulation amount of the absorbent that circulates into the water flow oxidation device, an amount of air to be introduced into the absorbent storage tank can be reduced, and an oxygen excessive state can be prevented.

In some embodiments with the configuration described above, it is configured to execute control for varying an amount of the air supplied to the water flow oxidation device with a valve.

With the configuration described above, by executing control for varying the amount of the air to be supplied to the water flow oxidation device using the valve, the amount of the air to be introduced into the absorbent storage tank can be reduced, and the oxygen excessive state can be prevented.

In some embodiments with the configuration described above, the control device is configured to reduce the number of operations of the water flow oxidation devices when the rate of the sulfur compound included in the flue gas or the rate of the sulfur compound in the absorbent within the absorbent storage tank is lower than a predetermined threshold set in advance.

With the configuration described above, when the rate of the sulfur compound in the absorbent is lower than the predetermined threshold set in advance, the amount of the air to be introduced can be reduced by reducing the number of the water flow oxidation devices in operation for jetting the air, and the oxygen excessive state can be prevented.

In some embodiments with the configuration described above, the absorbent circulation line includes a plurality of circulation pumps, and when the rate of the sulfur compound included in the flue gas or the rate of the sulfur compound in the absorbent within the absorbent storage tank is lower than the predetermined threshold set in advance, the control device is configured to stop operations of some of the circulation pumps to reduce the circulation amount of the absorbent.

With the configuration described above, when the rate of the sulfur compound is lower than the predetermined threshold set in advance, by stopping some of operations of the plurality of circulation pumps and reducing the circulation amount of the absorbent, the amount of absorbent to be introduced into the water flow oxidation device can be reduced, the amount of air to be introduced can be reduced, and the oxygen excessive state can be prevented.

In some embodiments with the configuration described above, included are a plurality of air supply lines that supply air to the respective water flow oxidation devices, and valves that are arranged in the respective air supply lines and adjust the supply amount of the air, wherein when the rate of the sulfur compound included in the flue gas or the rate of the sulfur compound in the absorbent within the absorbent storage tank is lower than the predetermined threshold set in advance, the control device is configured to execute closing some of the valves or adjusts a degree of opening of the valves to reduce the amount of the air supplied to the water flow oxidation device.

With the configuration described above, when the rate of the sulfur compound is lower than the predetermined threshold set in advance, by closing some of the plurality of valves or adjusting the degree of opening of the valves to reduce the amount of the air to be supplied to the water flow oxidation device, the amount of air to be introduced into the water flow oxidation device can be reduced, and the oxygen excessive state can be prevented.

In some embodiments with the configuration described above, the water flow oxidation device is configured to include a connection part connected to an absorbent branch line that branches part of the absorbent from the absorbent circulation line, a liquid supply passage that communicates with the connection part and includes a flow channel narrow part formed inside, and an air supply passage having an opening in a downstream area of the flow channel narrow part within the liquid supply passage.

With the configuration described above, when the absorbent flowed in from the connection part passes through the flow channel narrow part, the flow of the introduced absorbent generates a negative pressure region in a downstream area of the flow channel narrow part, a jet flow is jetted from a distal end side while suctioning the air supplied from the air supply passage via the opening due to a contracted flow effect, minute air is introduced into the absorbent storage tank, and stirring in the absorbent storage tank is facilitated.

In some embodiments with the configuration described above, in stopping the operations of the water flow oxidation devices, the control device is configured to stop the operations of any of the water flow oxidation devices at intervals of every predetermined number in an arrangement direction of the water flow oxidation devices.

With the configuration described above, by performing reduced operation such that the operation of any of the water flow oxidation devices is stopped at intervals of every predetermined number, stirring caused by a jet flow in the absorbent storage tank can be made uniform.

In some embodiments with the configuration described above, it is configured to include an oxidation-reduction potential meter that measures oxidation-reduction potential within the absorbent storage tank, wherein the control device obtains the rate of the sulfur compound in the absorbent within the absorbent storage tank based on a measured value of the oxidation-reduction potential measured with the oxidation-reduction potential meter.

With the configuration described above, by obtaining the rate of sulfur compound based on the oxidation-reduction potential, and performing reduced operation when the rate of the sulfur compounds exceeds an appropriate range and the peroxidation state is caused, the oxygen excessive state is prevented from being caused in the absorbent storage tank.

In some embodiments with the configuration described above, the control device is configured to adjust any one or both of the jetting amount of the absorbent jetted from the water flow oxidation device and the supply amount of the air supplied to the water flow oxidation device based on at least one of values of a boiler load, inlet $SO_2$ concentration, outlet $SO_2$ concentration, and a desulfurization ratio, and the rate of the sulfur compound in the absorbent within the absorbent storage tank With the configuration described above, by adjusting any one or both of the jetting amount of the absorbent jetted from the water flow oxidation device and the supply amount of the air supplied to the water flow oxidation device on the basis of at least one of values of a boiler load, inlet $SO_2$ concentration, outlet $SO_2$ concentration, and desulfurization ratio, and the rate of the sulfur compound in the absorbent within the absorbent storage tank, the amount of air to be introduced into the absorbent storage tank is reduced, and the oxygen excessive state is prevented.

In some embodiments with the configuration described above, it is configured to include a stirring device within the absorbent storage tank, wherein the stirring device is started/stopped by the control device.

With the configuration described above, stirring within the absorbent storage tank is facilitated by the stirring device.

In some embodiments with the configuration described above, it is configured to include a blower that supplies the air to the water flow oxidation device, wherein, when the rate of the sulfur compound included in the flue gas or the rate of the sulfur compound in the absorbent is higher than the threshold, the control device increases the supply amount of the air supplied from the blower to the water flow oxidation device.

With the configuration described above, air is forcibly supplied from the outside with the blower, so that oxidizing ability within the absorbent storage tank is improved.

In some embodiments with the configuration described above, it is configured to include a blower that supplies the air to the water flow oxidation device, wherein, in adjusting the supply amount of the air supplied to the water flow oxidation device, when the rate of the sulfur compound included in the flue gas or the rate of the sulfur compound in the absorbent is lower than a threshold, the control device reduces the supply amount of the air supplied from the blower to the water flow oxidation device.

With the configuration described above, by reducing the supply amount of the air to be supplied to the water flow oxidation device from the blower when the rate of the sulfur compound included in the flue gas or the rate of the sulfur compound in the absorbent is lower than the threshold, the control device reduces the amount of air to be introduced into the absorbent storage tank and prevents the oxygen excessive state from being caused.

An operation method for a wet flue gas desulfurization apparatus according to at least one embodiment of the invention is configured to include in removing a sulfur oxide in flue gas discharged from a combustor by bringing absorbent into contact with the sulfur oxide, the absorbent circulating in an absorbent circulation line from an absorbent storage tank including a water flow oxidation device that jets the absorbent and air, adjusting any one or both of a jetting amount of the absorbent jetted from the water flow oxidation device and a supply amount of the air supplied to the water flow oxidation device based on a rate of a sulfur compound included in the flue gas or a rate of a sulfur compound in the absorbent in the absorbent storage tank.

With the configuration described above, by adjusting any one or both of the jetting amount of the absorbent jetted from the water flow oxidation device and the supply amount of the air to be supplied to the water flow oxidation device on the basis of the rate of the sulfur compound, the amount of air to be introduced into the absorbent storage tank can be reduced, and the oxygen excessive state can be prevented.

Advantageous Effects of Invention

With a wet flue gas desulfurization apparatus according to at least one of embodiments of the present invention, by adjusting any one or both of the jetting amount of the absorbent jetted from the water flow oxidation device and the supply amount of the air to be supplied to the water flow oxidation device on the basis of the rate of the sulfur compound included in the flue gas or the rate of the sulfur compound in the absorbent within the absorbent storage tank of an absorber of the wet flue gas desulfurization apparatus, an amount of air to be introduced into the absorbent storage tank can be reduced, an oxygen excessive state can be prevented, and an appropriate operation state can be maintained.

BRIEF DESCRIPTION OF DRAWINGS

FIG. 4 is a schematic diagram illustrating an example of a water flow oxidation device according to the first embodiment.

FIG. 5 is a diagram illustrating an opening/closing state of a valve in a normal operation and a reduced operation in accordance with a boiler load.

FIG. 13 is a schematic diagram illustrating a wet flue gas desulfurization apparatus according to a third embodiment.

FIG. 20 is a diagram illustrating an opening/closing state of an air valve in a normal operation and a reduced operation in accordance with a boiler load.

FIG. 21 is a graph obtained by adjusting the boiler load and the amount of air using an air adjusting valve.

FIG. 22A is a diagram illustrating an opening/closing state of an opening/closing valve in a normal operation and a reduced operation in accordance with a boiler load.

FIG. 22B is a diagram illustrating an opening/closing state of an air valve in a normal operation and a reduced operation in accordance with a boiler load.

DESCRIPTION OF EMBODIMENTS

The following describes some embodiments of the present invention in detail with reference to the drawings. The present invention is not limited to the following embodiments. Components in the following embodiments include components easily conceivable by those skilled in the art, substantially the same components, and what is called equivalents. The components disclosed in the following embodiments can be appropriately combined.

First Embodiment

Figure 1:
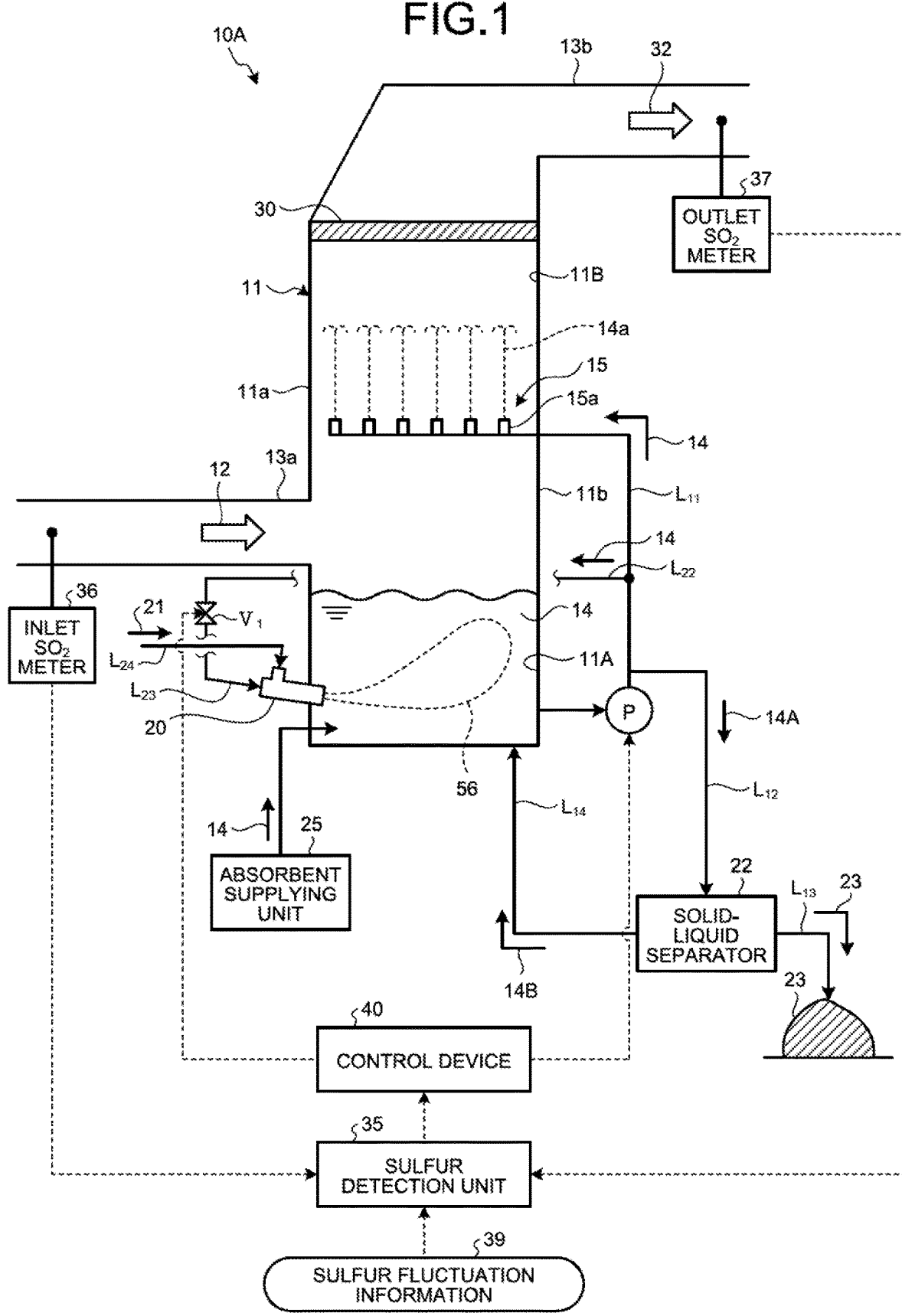
FIG. 1 is a schematic diagram illustrating a wet flue gas desulfurization apparatus according to a first embodiment.

FIG. 1 is a schematic diagram illustrating a wet flue gas desulfurization apparatus according to a first embodiment of the present invention. As illustrated in FIG. 1, a wet flue gas desulfurization apparatus (hereinafter, referred to as a "desulfurization apparatus") 10A is supplied with flue gas generated when fuel is subjected to combustion using a combustor such as a boiler, and reduces or removes sulfur oxide from the supplied flue gas.

The desulfurization apparatus 10A includes an absorber 11, a gas introduction unit 13a, an absorbent jetting unit 15, a plurality of water flow oxidation devices 20, an absorbent supplying unit 25, a demister 30, a gas discharging unit 13b, a sulfur detection unit 35, a control device 40, an absorbent circulation line $L_{11}$, a desulfurization wastewater discharging line $L_{12}$, a gypsum discharging line $L_{13}$, a separated liquid returning line $L_{14}$, a plurality of circulation pumps P, and a plurality of opening/closing valves V. The desulfurization apparatus 10A according to the first embodiment is a desulfurization apparatus using a limestone-gypsum method, and limestone slurry (aqueous solution obtained by dissolving limestone powder in water) is used as the absorbent 14.

The absorber 11 removes a sulfur oxide in flue gas 12 with absorbent 14. The absorber 11 includes an absorbent storage tank 11A and a flue gas passage 11B. The absorbent storage tank 11A stores the absorbent 14. The flue gas passage 11B is arranged on an upper side in a vertical direction of the absorbent storage tank 11A. The flue gas 12 passes through the flue gas passage 11B.

The gas introduction unit 13a is arranged on an upper side of the absorber 11, that is, a side wall 11a of the flue gas passage 11B of the absorber 11. The gas introduction unit 13a introduces the flue gas 12 generated in the combustor into the absorber 11. The absorbent jetting unit 15 is arranged inside the flue gas passage 11B. The absorbent jetting unit 15 includes a spray unit 15a that sprays the absorbent 14. The spray unit 15a sprays the absorbent 14 upward in the vertical direction.

The absorbent circulation line $L_{11}$ connects the absorbent storage tank 11A with the absorbent jetting unit 15. The circulation pump P is arranged in the absorbent circulation line $L_{11}$. Although FIG. 1 illustrates one circulation pump P, a plurality of circulation pumps P are arranged in some embodiments.

The desulfurization apparatus 10A forms a flow from the absorbent storage tank 11A toward the absorbent jetting unit 15 in the absorbent circulation line $L_{11}$ with the circulation pump P to supply the absorbent 14 in the absorbent storage tank 11A to the absorbent jetting unit 15. The absorbent 14 supplied to the absorbent jetting unit 15 is jetted from the spray unit 15a to the flue gas passage 11B. The absorbent 14 jetted from the spray unit 15a is also referred to as jetted liquid 14a.

Figure 2:
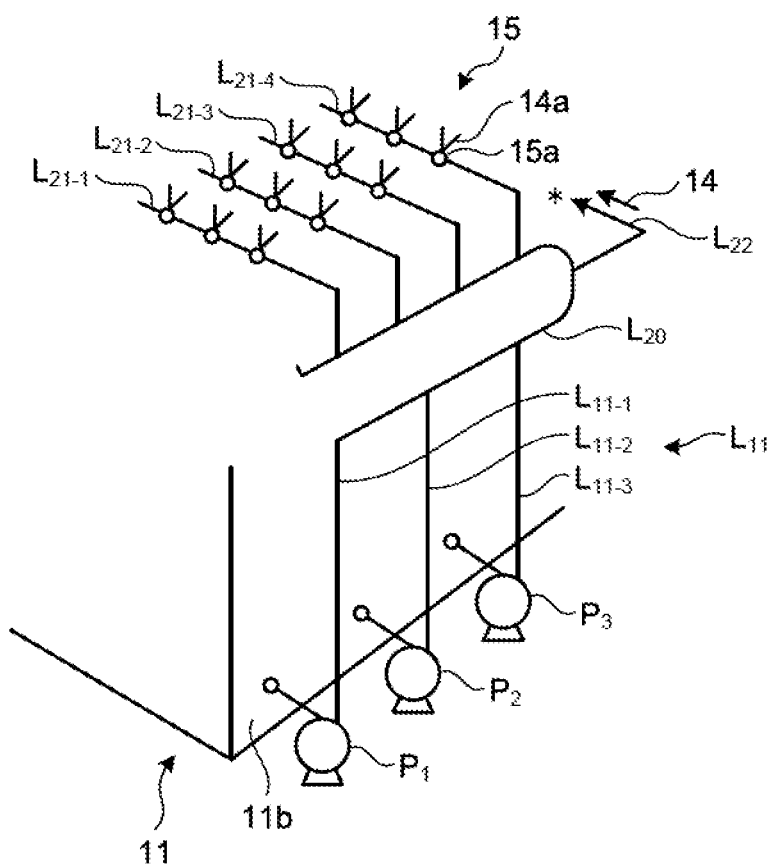
FIG. 2 is a schematic diagram of a circulation line system for absorbent on an absorbent extracting side according to the first embodiment.
Figure 3:
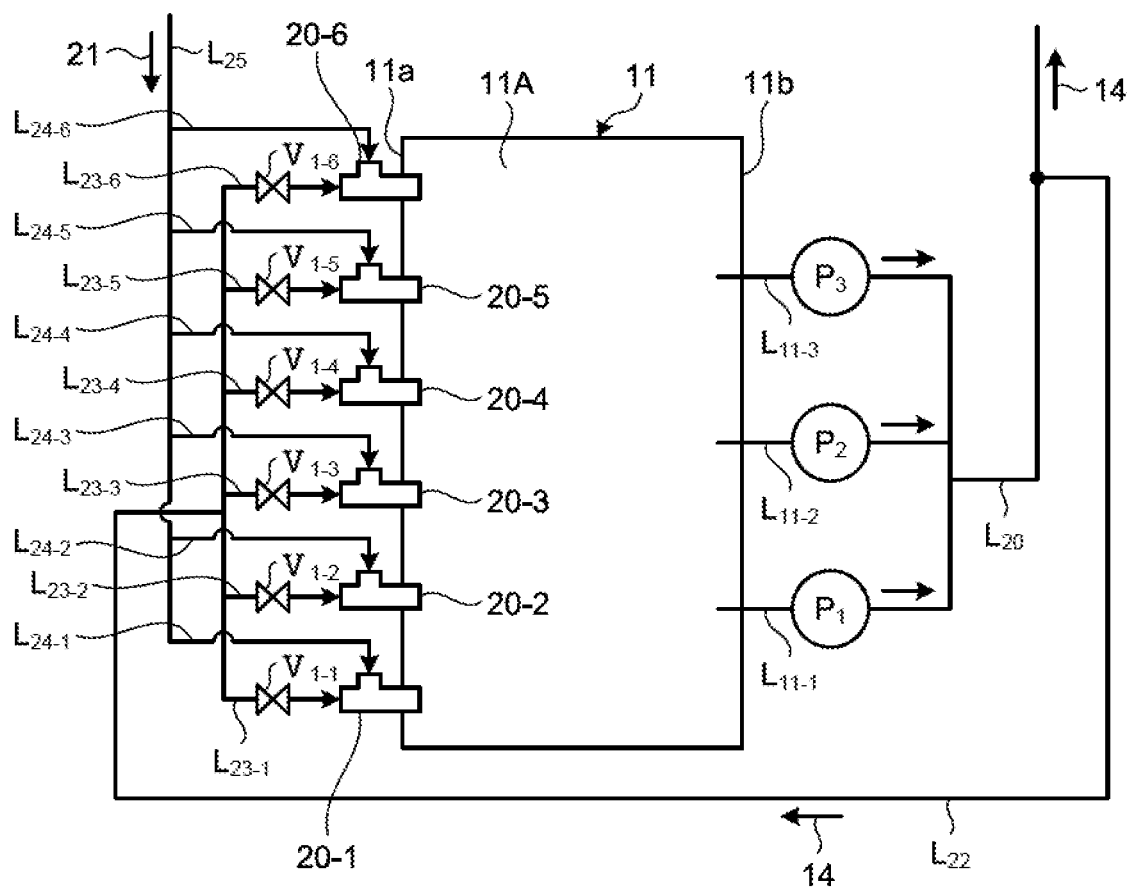
FIG. 3 is a plane schematic diagram of the circulation line system for absorbent according to the first embodiment.

The following describes a circulation line system for circulating the absorbent 14 in the absorber 11 by extracting the absorbent 14 in the absorbent storage tank 11A of the absorber 11 to be supplied by the absorber 11 with reference to FIGS. 2 and 3. FIG. 2 is a schematic diagram of the circulation line system for the absorbent on an absorbent extracting side. FIG. 3 is a plane schematic diagram of the circulation line system for the absorbent. FIG. 2 illustrates a portion for supplying the absorbent 14 to the absorbent jetting unit 15 from a portion for extracting the absorbent 14 which is arranged on a side wall 11b side opposed to the side wall 11a in the circulation line system. FIG. 3 illustrates a portion for supplying the absorbent 14 to the water flow oxidation device 20 which is arranged on the side wall 11a side from a portion for extracting the absorbent 14 which is arranged on the side wall 11b side in the circulation line system. FIG. 3 does not illustrate a portion connected to the absorbent jetting unit 15 of the absorbent circulation line $L_{11}$.

In the present embodiment, the absorbent circulation line $L_{11}$, and the water flow oxidation device 20 and the gas introduction unit 13a are arranged on opposed wall surfaces of the absorber 11, but arrangement positions are not limited thereto. The absorbent circulation line $L_{11}$, the water flow oxidation device 20, and the gas introduction unit 13a may be arranged on the same surface. In a case in which the absorber 11 has a long shape in one direction on a horizontal plane, it is preferable to arrange the absorbent circulation line $L_{11}$, the water flow oxidation device 20, and the gas introduction unit 13a on a wall surface on a long side.

As illustrated in FIGS. 2 and 3, the circulation line system for the absorbent 14 includes the absorbent circulation line $L_{11}$, and an absorbent supply line $L_{22}$ and an absorbent branch line $L_{23}$ ($L_{23-1}$ to $L_{23-6}$) for supplying part of the absorbent 14 in the absorbent circulation line $L_{11}$ to the water flow oxidation device 20. As illustrated in FIGS. 2 and 3, the desulfurization apparatus 10A includes three circulation pumps P ($P_1$ to $P_3$) and a plurality of spray units 15a. The absorbent circulation line $L_{11}$ supplies the absorbent 14 in the absorbent storage tank 11A to the spray units 15a using the three circulation pumps P ($P_1$ to $P_3$). The absorbent circulation line $L_{11}$ includes three extracting lines $L_{11-1}$ to $L_{11-3}$, collective piping $L_{20}$, and four absorbent jetting lines $L_{21}$ ($L_{21-1}$ to $L_{21-4}$). The number of extracting lines $L_{11-1}$ to $L_{11-3}$ and the number of absorbent jetting lines $L_{21}$ ($L_{21-1}$ to $L_{21-4}$) may be adjusted in accordance with the number of circulation pumps P and the arrangement of the spray units 15a.

One end of each of the extracting lines $L_{11-1}$ to $L_{11-3}$ is connected to the side wall 11b opposed to the side wall 11a on which the gas introduction unit 13a of the absorber 11 is arranged, and the other end thereof is connected to the collective piping $L_{20}$. The circulation pumps P ($P_1$ to $P_3$) are respectively arranged in the extracting lines $L_{11-1}$ to $L_{11-3}$. The circulation pumps P ($P_1$ to $P_3$) supply the absorbent 14 to the collective piping $L_{20}$ from the absorbent storage tank 11A via the arranged extracting lines $L_{11-1}$ to $L_{11-3}$. The collective piping $L_{20}$ is piping in which the absorbent 14 supplied from the extracting lines $L_{11-1}$ to $L_{11-3}$ is collected. The collective piping $L_{20}$ has a diameter larger than those of the extracting lines $L_{11-1}$ to $L_{11-3}$. The collective piping $L_{20}$ according to the present embodiment has a U-shape. The collective piping $L_{20}$ supplies the absorbent 14 supplied from the extracting lines $L_{11-1}$ to $L_{11-3}$ to other connected piping. The absorbent jetting lines $L_{21}$ ($L_{21-1}$ to $L_{21-4}$) are connected to the collective piping $L_{20}$, and the spray units 15a are arranged therein.

The desulfurization apparatus 10A extracts the absorbent 14 in the absorbent storage tank 11A to the outside via the extracting lines $L_{11-1}$ to $L_{11-3}$, and supplies the absorbent 14 to the collective piping $L_{20}$. The absorbent 14 supplied to the collective piping $L_{20}$ is supplied to the absorbent jetting lines $L_{21-1}$ to $L_{21-4}$ and the absorbent supply line $L_{22}$ branched from the collective piping $L_{20}$. The absorbent 14 supplied to the absorbent jetting lines $L_{21-1}$ to $L_{21-4}$ is jetted toward a top side of the absorber from each of the spray units 15a in a fountain-like manner as the jetted liquid 14a.

Next, as illustrated in a circulation line system diagram of FIG. 3, the absorbent supply line $L_{22}$ is connected to the collective piping $L_{20}$, and part of the absorbent 14 of the collective piping $L_{20}$ flows therein. In the present embodiment, one end of each of the six absorbent branch lines $L_{23}$ ($L_{23-1}$ to $L_{23-6}$) is connected to the absorbent supply line $L_{22}$, and the other end thereof is connected to the water flow oxidation device 20 (20-1 to 20-6). The absorbent branch line $L_{23}$ connects the absorbent supply line $L_{22}$ to the water flow oxidation device 20, and supplies the absorbent 14 from the absorbent supply line $L_{22}$ to the water flow oxidation device 20. First to sixth opening/closing valves $V_1$ ($V_{1-1}$ to $V_{1-6}$) are arranged in the absorbent branch lines $L_{23-1}$ to $L_{23-6}$, respectively. The opening/closing valve $V_1$ switches between opening and closing to switch between supplying and not supplying the absorbent 14 to the water flow oxidation device 20 from the absorbent supply line $L_{22}$. As illustrated in FIG. 1, the absorbent supply line $L_{22}$ is preferably arranged at a position on an upper side with respect to a liquid surface of the absorbent 14 in the absorbent storage tank 11A. Due to this, in a case in which supply of the absorbent 14 to the water flow oxidation device 20 is stopped when the circulation pumps P ($P_1$ to $P_3$) are stopped (the desulfurization apparatus is stopped), the absorbent 14 can be naturally discharged from the piping. For another example, in a case of using the limestone-gypsum method, slurry liquid circulates, so that occurrence of precipitation of gypsum 23 can be prevented in the piping for supplying to the water flow oxidation device 20 when the circulation pump is stopped.

As illustrated in a circulation line system diagram of FIG. 3, in the present embodiment, distal ends of the six absorbent branch lines $L_{23-1}$ to $L_{23-6}$ are connected to the six water flow oxidation devices 20-1 to 20-6, respectively, and each of a plurality of (in the present embodiment, six) air supply lines $L_{24-1}$ to $L_{24-6}$ is connected to an air supply passage 54 of an opening 53. The blower is not arranged on an end side of the air supply lines $L_{24-1}$ to $L_{24-6}$, so that air 21 is introduced by itself due to a contracted flow effect. This is a self-supply type air introduction method for naturally introducing the air 21 due to only the contracted flow effect instead of forcing the air into the water flow oxidation device 20 from the outside using an air forcing device such as a blower, for example. A forcing type air introduction method for arranging the blower will be described later.

The following describes an example of the water flow oxidation device with reference to FIG. 4. FIG. 4 is a schematic diagram illustrating an example of the water flow oxidation device according to the first embodiment. As illustrated in FIG. 4, the water flow oxidation device 20 according to the first embodiment is a gas-liquid mixing and stirring device including a connection part 50 connected to the absorbent branch line $L_{23}$, a liquid supply passage 52 communicating with the connection part 50 and including a flow channel narrow part 51 formed therein, and the air supply passage 54 including the opening 53 in a downstream area of the flow channel narrow part 51 inside the liquid supply passage 52.

In the water flow oxidation device 20, a flow of the absorbent 14 supplied into the liquid supply passage 52 generates a negative pressure region 55 in a downstream area of the flow channel narrow part 51, and is jetted as a jet flow 56 from a distal end side of the water flow oxidation device 20 while suctioning the air 21 supplied from the air supply passage 54 via the opening 53 due to the contracted flow effect. The jet flow 56 jets the absorbent 14 to reach the side wall 11b opposed to a jetting port of the water flow oxidation device 20. Accordingly, the water flow oxidation device 20 supplies the jet flow 56 including bubbles of the air 21 into the absorbent storage tank 11A.

As illustrated in FIG. 1, the desulfurization wastewater discharging line $L_{12}$ connects the absorbent circulation line $L_{11}$ with a solid-liquid separator 22. Part of the absorbent 14 flowing in the absorbent circulation line $L_{11}$ flows into the desulfurization wastewater discharging line $L_{12}$ as desulfurization wastewater 14A. The gypsum discharging line $L_{13}$ is connected to the solid-liquid separator 22. The separated liquid returning line $L_{14}$ connects the solid-liquid separator 22 with the absorbent storage tank 11A.

Part of the absorbent 14 circulating in the absorber 11 via the absorbent circulation line $L_{11}$ and the desulfurization wastewater discharging line $L_{12}$ is supplied to the solid-liquid separator 22 as the desulfurization wastewater 14A. The solid-liquid separator 22 subjects the desulfurization wastewater 14A to solid-liquid separation. Specifically, the solid-liquid separator 22 separates the desulfurization wastewater 14A into separated liquid 14B as a liquid component and the gypsum 23 as a solid component. The gypsum 23 generated by subjecting the desulfurization wastewater 14A to solid-liquid separation with the solid-liquid separator 22 is discharged from the gypsum discharging line $L_{13}$ to the outside. The separated liquid 14B generated by subjecting the desulfurization wastewater 14A to solid-liquid separation with the solid-liquid separator 22 is returned to the absorbent storage tank 11A via the separated liquid returning line $L_{14}$.

The demister 30 is arranged in the flue gas passage 11B which is on a downstream side with respect to the absorbent jetting unit 15 in a flowing direction of the flue gas 12. The demister 30 removes mist in the flue gas 12 in the flue gas passage 11B. The desulfurization apparatus 10A brings the absorbent 14 in the absorber 11 into gas-liquid contact with the flue gas 12 to remove the sulfur oxide in the flue gas 12 to be cleaned gas 32. The gas discharging unit 13b is connected to the flue gas passage 11B of the absorber 11. The gas discharging unit 13b discharges the cleaned gas 32 that has passed through the demister 30.

The sulfur detection unit 35 obtains a rate (or concentration) of sulfur compounds in the absorbent 14 in the absorbent storage tank 11A. The sulfur detection unit 35 may be equipment that calculates concentration of sulfur oxides in the flue gas 12 to be flowed on the basis of various pieces of information such as an operation condition of a combustor that generates the flue gas 12 or fuel for combustion, and indirectly calculates the rate (concentration) of the sulfur compounds in the absorbent 14 in the absorbent storage tank 11A on the basis of the calculation result and an operation condition of the desulfurization apparatus 10A. A predetermined amount of the absorbent 14 in the absorbent storage tank 11A is extracted, an acid (for example, sulfuric acid or hydrochloric acid) is added to the absorbent 14, and pH is adjusted to be a predetermined value to decompose sulfite into sulfur dioxide to be deaerated. The deaerated sulfur dioxide is diluted to be a predetermined amount with inert gas, and concentration of the diluted gas is continuously detected by a measurement device such as an infrared spectroscope, for example. The sulfur detection unit 35 may be equipment that transmits a sulfur dioxide concentration signal to an operation unit, operates a sulfurous acid ion in the absorbent 14 within the absorbent storage tank 11A on the basis of values such as a dilution ratio and a sample collecting amount, and calculates the rate of the sulfur compounds.

For another example, an inlet $SO_2$ meter 36 is arranged in a flue gas duct of the gas introduction unit 13a, an outlet $SO_2$ meter 37 is arranged in a flue gas duct of the gas discharging unit 13b, and the rate of sulfur compounds (S-containing compounds) in the absorbent 14 may be obtained from an amount of $SO_2$ in the flue gas 12 and the cleaned gas 32 measured with the above meters or a desulfurization ratio converted from these values. However, the present invention is not limited thereto.

The control device 40 controls the number of water flow oxidation devices 20 to be operated on the basis of the rate of sulfur compounds (S-containing compounds) in the absorbent 14 obtained with the sulfur detection unit 35. That is, the control device 40 controls the number of operating water flow oxidation devices 20 that jet the absorbent 14 and the air 21 on the basis of the rate of the sulfur compounds (S-containing compounds) in the absorbent 14 obtained with the sulfur detection unit 35. For example, when the rate of sulfur compounds in the absorbent 14 is lower than a predetermined threshold set in advance (when an amount of sulfite ions is low), the control device 40 reduces the number of water flow oxidation devices 20 in operation, that is, reduces the number of operating water flow oxidation devices 20 that jet the absorbent 14 and the air 21.

In addition to reduced operation in which the number of operating water flow oxidation devices 20 is reduced, the control device 40 may perform control for varying a jetting amount of the absorbent 14 jetted from the water flow oxidation device 20. The jetting amount of the absorbent 14 may be varied such that a flow rate adjusting valve, a variable pump, or the like are arranged and operated in the absorbent branch lines $L_{23-1}$ to $L_{23-6}$ branched from the absorbent supply line $L_{22}$ for supplying part of the absorbent 14 to the water flow oxidation device 20. As a result, the jetting amount of the absorbent 14 can be adjusted while maintaining the number of operating water flow oxidation devices 20 without cutting down the operations of the water flow oxidation devices 20.

In the present embodiment, adjustment of the jetting amount of the absorbent 14 jetted from the water flow oxidation device 20 performed by the control device 40 includes one or both of adjustment for reducing the operations of a plurality of water flow oxidation devices 20 to reduce the jetting amount of the absorbent 14 into the absorbent storage tank 11A, and adjustment for adjusting a supply amount of the absorbent 14 supplied to the water flow oxidation device 20 with a pump or a valve while continuing the operations of the water flow oxidation devices 20 to reduce the jetting amount into the absorbent storage tank 11A.

Next, the following describes the entire operation of the desulfurization apparatus 10A according to an embodiment of the present invention. In the desulfurization apparatus 10A according to some embodiments, the flue gas 12 discharged from a combustor (not illustrated) is introduced into the absorber 11 through the gas introduction unit 13a. The flue gas 12 introduced into the absorber 11 is brought into contact with the jetted liquid 14a of the absorbent 14 as circulating limestone slurry, and $SO_2$ in the flue gas 12 is removed by the absorbent 14.

The absorbent 14 as limestone slurry is supplied from the absorbent supplying unit 25 to the absorbent storage tank 11A within a bottom part of the absorber 11. The absorbent 14 supplied to the absorbent storage tank 11A is sent to the plurality of spray units 15a inside the absorber 11 via the absorbent circulation line $L_{11}$, and the jetted liquid 14a is jetted from the spray unit 15a toward the top side of the absorber 11 in a fountain-like manner. The circulation pumps P ($P_1$ to $P_3$) are arranged in the absorbent circulation line $L_{11}$, and the absorbent 14 as limestone slurry is sent from the absorbent circulation line $L_{11}$ to the spray unit 15a when the circulation pumps P ($P_1$ to $P_3$) are operated. By bringing ascending flue gas 12 introduced from the gas introduction unit 13a of the absorber 11 into gas-liquid contact with the jetted and falling limestone slurry, the sulfur oxide in the flue gas 12 is absorbed by the absorbent 14 to be separated and removed from the flue gas 12. The flue gas 12 cleaned by the absorbent 14 as limestone slurry is discharged as the cleaned gas 32 from the gas discharging unit 13b on the top side of the absorber 11, and released to the outside from a stack (not illustrated).

Inside the absorber 11, the sulfur dioxide ($SO_2$) in the flue gas 12 shows a reaction with the limestone slurry as represented by the following reaction formula (1).

$$SO_2+CaCO_3 \rightarrow CaSO_3+CO_2 \quad (1)$$

The limestone slurry that has absorbed $SO_x$ in the flue gas 12 is oxidized by the air 21 supplied from the water flow oxidation device 20 into the absorbent storage tank 11A on a bottom part side of the absorber 11, and shows a reaction with the air 21 as represented by the following reaction formula (2).

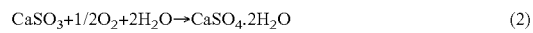

$$CaSO_3+1/2O_2+2H_2O \rightarrow CaSO_4.2H_2O \quad (2)$$

In this way, $SO_x$ in the flue gas 12 is captured in a form of gypsum ($CaSO_4.2H_2O$) in the absorber 11.

As described above, the liquid stored in the absorbent storage tank 11A in the bottom part of the absorber 11 is pumped up to be used as the limestone slurry. In the absorbent 14 as the pumped-up limestone slurry, gypsum ($CaSO_4.2H_2O$) is mixed as represented by the reaction formulas (1) and (2) following the operation of the desulfurization apparatus 10A. In the following description, limestone-gypsum slurry (limestone slurry mixed with gypsum) for absorbing the sulfur dioxide is referred to as absorbent.

The absorbent 14 used for desulfurization within the absorber 11 is circulated and reused in the absorbent circulation line $L_{11}$, part of the absorbent 14 is discharged to the outside as the desulfurization wastewater 14A via the desulfurization wastewater discharging line $L_{12}$ connected to the absorbent circulation line $L_{11}$ to be separately sent to the solid-liquid separator 22, and is subjected to dehydration processing.

The solid-liquid separator 22 separates the gypsum 23 as a solid matter in the desulfurization wastewater 14A and the separated liquid 14B as a liquid component. As the solid-liquid separator 22, for example, a belt filter, a centrifugal separator, and a decanter type centrifugal settler are used. Thus, the desulfurization wastewater 14A discharged from the absorber 11 is separated into the gypsum 23 as a solid matter and the separated liquid 14B as dehydrated filtrate by the solid-liquid separator 22. In this separation processing, mercuric chloride in the desulfurization wastewater 14A as part of the absorbent 14 is in a state of being absorbed by the gypsum 23, and separated together with the gypsum 23 from the liquid. The separated gypsum 23 is discharged to the outside of the system (out of the system). On the other hand, the separated liquid 14B from the solid-liquid separator 22 is supplied into the absorbent storage tank 11A of the absorber 11 as returned water via the separated liquid returning line $L_{14}$. The desulfurization apparatus 10A supplies a predetermined amount of air 21 from the water flow oxidation device 20 into the absorbent storage tank 11A in the bottom part of the absorber 11 to oxidize the sulfite ions in the absorbent 14.

The desulfurization apparatus 10A controls the operation of the water flow oxidation device 20 and the amount of the absorbent 14 circulating in the absorbent circulation line $L_{11}$ on the basis of the rate of the sulfur compounds in the absorbent 14. The desulfurization apparatus 10A sets a desired threshold range of the rate of the sulfur compounds, that is, an upper limit value and a lower limit value for the rate of the sulfur compounds in the absorbent 14 within the absorbent storage tank 11A. The threshold is, for example, defined on the basis of the rate of the sulfur compounds that can maintain desulfurization performance when the desulfurization apparatus 10A is operated with the highest efficiency in design. Specifically, the threshold is set on the basis of the rate of the sulfur compounds in the absorbent 14 in a state of performing processing for maintaining desulfurization performance at the time of maximum processing of required performance of the desulfurization apparatus 10A. The time of maximum processing of required performance of the desulfurization apparatus 10A means that a combustor is in a 100% operation state of a basic plan and combustion of fuel having a large amount of sulfur compounds (S-containing compounds) is subjected. The threshold may be set on the basis of the rate of sulfur compounds with which the desulfurization apparatus can be efficiently operated.

The control device 40 varies the number of water flow oxidation devices 20 to be operated on the basis of the rate of the sulfur compounds in the absorbent 14 obtained with the sulfur detection unit 35. When the sulfur compounds in the absorbent 14 is equal to or lower than the lower limit of the threshold, the control device 40 closes some of the opening/closing valves $V_1$ to stop supply of the absorbent 14 to the connected water flow oxidation device 20. When supply of the absorbent 14 to some of the water flow oxidation devices 20 is stopped and the sulfur compounds in the absorbent 14 is equal to or higher than the upper limit of the threshold, the control device 40 opens the closed opening/closing valves $V_1$ to supply the absorbent 14 to the connected water flow oxidation device 20. The control device 40 controls opening and closing of the opening/closing valve $V_1$ to adjust the jetting amount of the absorbent 14 jetted to the absorbent 14 stored in the absorbent storage tank 11A and an introduction amount of the air 21 accompanying with jetting of the absorbent 14.

When the rate of the sulfur compounds in the absorbent 14 within the absorbent storage tank 11A is lower than the predetermined threshold, the control device 40 reduces an operation rate of the circulation pumps P ($P_1$ to $P_3$) to reduce the circulation amount of the circulating absorbent 14.

By reducing the circulation amount of the absorbent 14 to be circulated and reducing the number of water flow oxidation devices 20 to be operated, the control device 40 can reduce fluctuation in the amount of the absorbent 14 to be supplied to one water flow oxidation device 20. Due to this, the introduction amount of the air 21 introduced into the absorbent storage tank 11A by one water flow oxidation device 20 can be prevented from fluctuating, and performance of circulating the absorbent 14 and performance of introducing the air 21 into the absorbent 14 of one water flow oxidation device 20 can be prevented from being deteriorated. As a result, the performance of the water flow oxidation devices 20 in operation can be maintained while reducing the entire introduction amount of the air 21 in accordance with the rate of the sulfur compound. Accordingly, the entire device can be efficiently operated while preventing excessive oxygen in the absorbent 14 within the absorbent storage tank 11A.

The following describes an example of control performed by the control device 40. In the following example, described is a case of calculating concentration of the sulfur compounds in the absorbent 14 on the basis of an operation state of a combustor that supplies the flue gas 12, specifically, an operation load thereof. That is, described is a case in which the sulfur detection unit 35 obtains the rate of $SO_2$ concentration from the sulfur fluctuation information 39 on the basis of a state of a boiler load, and the control device 40 performs control while associating the boiler load with the number of water flow oxidation devices 20 to be operated. In the following example of control, the three circulation pumps $P_1$ to $P_3$ and the six water flow oxidation devices 20-1 to 20-6 are operated to perform desulfurization. However, the present invention is not limited thereto.

For example, when 100% load operation is performed with the boiler load, this is an operation state in a basic plan, so that the sulfur compounds ($SO_2$ concentration) in the flue gas 12 is not significantly fluctuated from an initial threshold ($\alpha_0$). Accordingly, the flue gas 12 includes the $SO_2$ concentration of the initial threshold ($\alpha_0$). Thus, when the 100% load operation in the basic plan is performed with the boiler load, in the present embodiment, all of the three circulation pumps $P_1$ to $P_3$ and the six water flow oxidation devices 20-1 to 20-6 are operated to perform desulfurization.

Thereafter, when the operation state with the planned 100% boiler load is continued, all of the three circulation pumps $P_1$ to $P_3$ and the six water flow oxidation devices 20-1 to 20-6 are kept being operated to continue desulfurization.

On the other hand, when the operation is changed from the basic plan and the boiler load is lowered (for example, when operation is performed with 50% output of a planned operation, such as night operation), the sulfur compounds ($SO_2$ concentration) become lower than the predetermined threshold ($\alpha_1$) set in advance. When the sulfur compounds ($SO_2$ concentration) are lower than the predetermined threshold ($\alpha_1$) set in advance, the $SO_2$ concentration as the sulfur compounds (S-containing compounds) in the flue gas 12 may decrease, and the concentration of the sulfur compounds in the absorbent 14 may decrease.

Thus, in the present embodiment, the sulfur detection unit 35 checks the decrease of the sulfur compound concentration on the basis of boiler load lowering information, the control device 40 instructs to change the number of circulation pumps P ($P_1$ to $P_3$) in operation from three to two (for example, $P_1$ and $P_2$, $P_1$ and $P_3$, or $P_2$ and $P_3$ are operated), and the operation of the water flow oxidation devices 20 is caused to be a reduced operation.

In the reduced operation, for example, the operations of the first, the third, and the fifth water flow oxidation devices 20-1, 20-3, and 20-5 are continued, and the operations of the second, the fourth, and the sixth water flow oxidation devices 20-2, 20-4, and 20-6 are stopped.

FIG. 5 illustrates an example of the reduced operation. FIG. 5 is a diagram illustrating an opening/closing state of a valve in a normal operation and reduced operation in accordance with the boiler load. As illustrated in FIG. 5, in a case of a planned operation (100% load operation), the first to the sixth opening/closing valves $V_{1-1}$ to $V_{1-6}$ are fully opened. On the other hand, in a case of a low load operation (1), the second, the fourth, and the sixth opening/closing valves $V_{1-2}$, $V_{1-4}$, and $V_{1-6}$ are closed, and introduction of the absorbent 14 into the second, the fourth, and the sixth water flow oxidation devices 20-2, 20-4, and 20-6 is stopped. Even if the circulation amount of the absorbent 14 is lowered when the number of circulation pumps P ($P_1$ to $P_3$) in operation is changed from three to two, the reduced operation is performed by operating the first, the third, and the fifth water flow oxidation devices 20-1, 20-3, and 20-5, so that power of the jet flow 56 is not reduced.

When the reduced operation is performed, a supply amount of the air 21 supplied from the first, the third, and the fifth water flow oxidation devices 20-1, 20-3, and 20-5 into the absorbent storage tank 11A is reduced. However, this is a low load operation, and concentration of sulfite ions in the absorbent 14 within the absorbent storage tank 11A is low, so that an amount of air for oxidizing sulfite ions into sulfate ions can be reduced, and as a result, the absorbent storage tank 11A can be prevented from being in a peroxidation state.

As described above, even in a case in which a total amount of the absorbent 14 as circulating liquid to be supplied to the water flow oxidation device 20 is reduced when the reduced operation of the water flow oxidation devices 20 and the operations of a plurality of circulation pumps P are adjusted, the operations of some of the water flow oxidation devices 20 are stopped due to the reduced operation, so that a contracted flow function is prevented from being deteriorated when the absorbent 14 passes through the flow channel narrow part 51 by appropriately adjusting the amount of the absorbent 14 to be supplied to the water flow oxidation device 20. As a result, a supply amount of the jet flow 56 that becomes fine is not reduced. Accordingly, an intake amount of the air 21 of self-supply type is not reduced, so that oxidation performance is not deteriorated. Power of the jet flow 56 into the absorbent storage tank 11A is not reduced, so that stirring efficiency within the absorbent storage tank 11A is not deteriorated.

As an example of the reduced operation of the water flow oxidation devices 20, devices of an odd number (1, 3, 5) among a plurality of devices are stopped, and devices of an even number (2, 4, 6) are operated to perform operation and stoppage at regular intervals. This is because, when an unbalanced reduced operation is performed such that the first, the second, and the third opening/closing valves $V_{1-1}$, $V_{1-2}$, and $V_{1-3}$ are closed and the fourth, the fifth, and the sixth opening/closing valves $V_{1-4}$, $V_{1-5}$, and $V_{1-6}$ are opened, the absorbent 14 jetted into the absorbent storage tank 11A is unevenly distributed, and inside stirring is insufficiently performed.

The number of water flow oxidation devices 20 to be reduced is appropriately changed depending on the concentration of sulfite ions to be processed.

In this way, the control device 40 preferably performs feedforward control, specifically, feedforward control for the circulation pumps P ($P_1$ to $P_3$) and the opening/closing valves $V_1$ ($V_{1-1}$ to $V_{1-6}$) on the basis of the operation condition of the combustor such as the boiler load.

The rate of the sulfur compounds in the flue gas 12 is fluctuated due to fluctuation in the amount of the sulfur compounds (S-containing compounds) in fuel to be supplied to the boiler (for example, change of a coal type), for example, in addition to fluctuation in the boiler load. The control device 40 may also perform feedforward control on the basis of the sulfur fluctuation information 39 including a piece of or two or more pieces of information such as a flow rate of a desulfurization ventilator (BUF), an air supply amount to the boiler, the inlet $SO_2$ concentration in the flue gas 12 to be introduced into the absorber 11, the outlet $SO_2$ concentration in the flue gas 12 discharged from the absorber 11, and the desulfurization ratio, in addition to the fluctuation in the boiler load.

In the present embodiment, the inlet $SO_2$ meter 36 is arranged in the flue gas duct of the gas introduction unit 13a, and the outlet $SO_2$ meter 37 is arranged in the flue gas duct of the gas discharging unit 13b, but the arrangement thereof can be omitted. In a case in which the inlet $SO_2$ meter 36 and the outlet $SO_2$ meter 37 are arranged, the rate of the sulfur compounds in the absorbent 14 is obtained by the sulfur detection unit 35 on the basis of an $SO_2$ amount in the flue gas 12 and the cleaned gas 32 measured by the inlet $SO_2$ meter 36 and the outlet $SO_2$ meter 37, or on the basis of a desulfurization ratio obtained from values of the $SO_2$ amount as the sulfur fluctuation information 39.

Accordingly, the sulfur detection unit 35 determines whether the rate of the sulfur compounds in the absorbent 14 within the absorbent storage tank 11A is lower than the predetermined threshold set in advance on the basis of the sulfur fluctuation information 39 including at least one of values such as the inlet $SO_2$ concentration, the outlet $SO_2$ concentration, and the desulfurization ratio except for the boiler load, and when the rate of the sulfur compounds is lower than the predetermined threshold, reduced operation of the water flow oxidation device 20 is performed to reduce the amount of air 21 to be introduced into the absorbent storage tank 11A and prevent the absorbent storage tank 11A from being in an oxygen excessive state.

Figure 6:
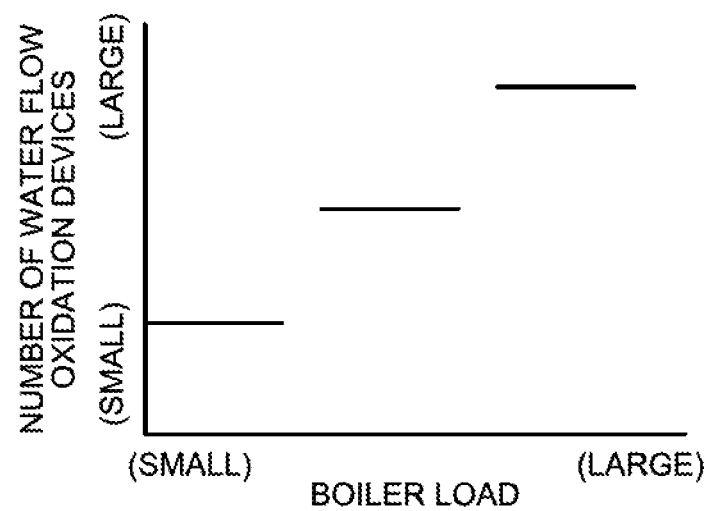
FIG. 6 is a diagram illustrating a relation between the boiler load and the number of operating water flow oxidation devices.

FIG. 6 is a diagram illustrating a relation between the boiler load and the number of operating water flow oxidation devices. As illustrated in FIG. 6, when a plurality of water flow oxidation devices 20 are arranged, reduced operation at three stages can be performed by gradually controlling the opening/closing valve $V_1$ by the control device 40 in accordance with a boiler operation load, and changing the number of operating water flow oxidation devices 20.

As described above, with the desulfurization apparatus 10A according to the first embodiment, for example, when the boiler operation load is low (for example, a low load operation as a night operation) and the rate of the sulfur compounds in the absorbent 14 within the absorbent storage tank 11A is lower than the predetermined threshold set in advance, the air 21 for oxidation supplied to the absorbent storage tank 11A is reduced by reducing the circulation amount of the circulating absorbent 14 and reducing the operations of the water flow oxidation devices 20 accordingly, and the oxygen is prevented from being excessively supplied to cause a peroxidation state. As a result, the absorbent 14 within the absorbent storage tank 11A is prevented from being in the peroxidation state, for example, a refractory peroxide is prevented from being generated (for example, tetravalent selenium becomes hexavalent selenium) in the absorbent 14.

In the above embodiment, the opening/closing valves $V_{1-1}$ to $V_{1-6}$ are controlled to perform the reduced operation using the opening/closing valves, but the present invention is not limited thereto. In place of the opening/closing valve, an adjusting valve may be used for adjusting a degree of opening of the valve by a predetermined amount.

For example, as illustrated in FIG. 5 as the low load operation (2), the second, the fourth, and the sixth opening/closing valves $V_{1-2}$, $V_{1-4}$, and $V_{1-6}$ are used as adjusting valves, a degree of opening of the adjusting valves is adjusted by the control device 40 to be closed by 50%, and 50% of the introduction amount of the absorbent 14 to the water flow oxidation devices 20-2, 20-4, and 20-6 is stopped. When the degree of opening is adjusted by 50%, a flow rate of the absorbent 14 introduced into the water flow oxidation devices 20-2, 20-4, and 20-6 is reduced, so that power of the jet flow 56 is reduced. However, since the amount of air is reduced, a peroxidation state can be prevented.

Figure 7:
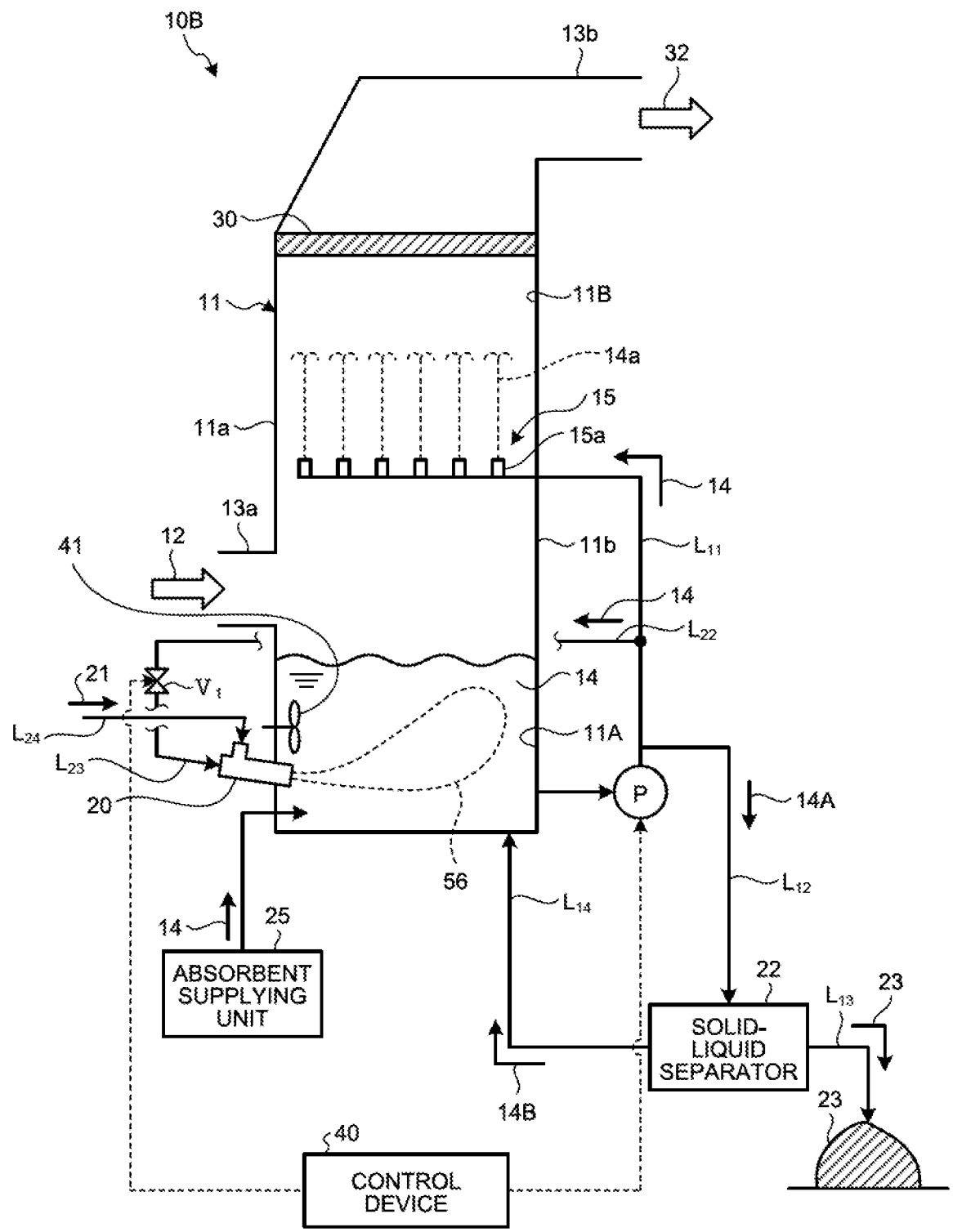
FIG. 7 is a schematic diagram illustrating another wet flue gas desulfurization apparatus according to the first embodiment.
Figure 8:
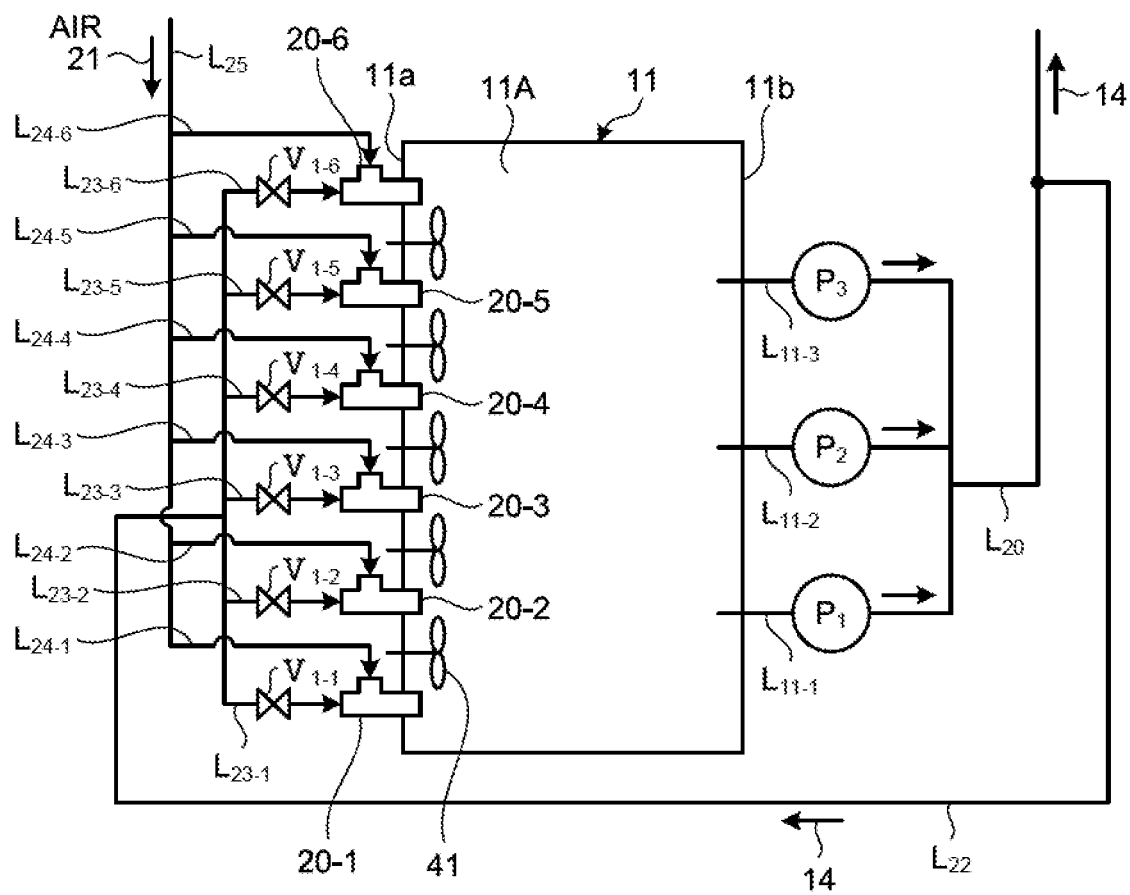
FIG. 8 is a plane schematic diagram of a circulation line system for absorbent in the wet flue gas desulfurization apparatus illustrated in FIG. 7.

FIG. 7 is a schematic diagram illustrating another wet flue gas desulfurization apparatus according to the first embodiment. FIG. 8 is a plane schematic diagram of a circulation line system for absorbent in the wet flue gas desulfurization apparatus illustrated in FIG. 7. A wet flue gas desulfurization apparatus 10B illustrated in FIG. 7 includes a stirring device 41 in addition to the components of the desulfurization apparatus 10A. The stirring device 41 is arranged on the side wall 11a of the absorbent storage tank 11A. That is, the stirring device 41 is arranged on the same surface as the water flow oxidation device 20. In the present embodiment, as illustrated in FIG. 8, the stirring device 41 is arranged between the water flow oxidation devices 20. The stirring device 41 includes, for example, a propeller, and can enhance stirring efficiency within the absorbent storage tank 11A by stirring the absorbent 14 at a position where the stirring device 41 is arranged.

In the desulfurization apparatus 10B, stirring within the absorbent storage tank 11A can be significantly facilitated by arranging the stirring device 41. Accordingly, in a case in which power of the jet flow 56 is reduced and stirring efficiency is deteriorated, or a case in which more stirring is required, the stirring device 41 can stir the absorbent 14. With the desulfurization apparatus 10B, even in the reduced operation of closing the opening/closing valve V to stop supply of the absorbent 14 from some of the water flow oxidation devices 20, stirring efficiency is improved by arranging the stirring device 41 and performing the reduced operation to preferentially operate the water flow oxidation device 20 adjacent to the stirring device 41.

Figure 9:
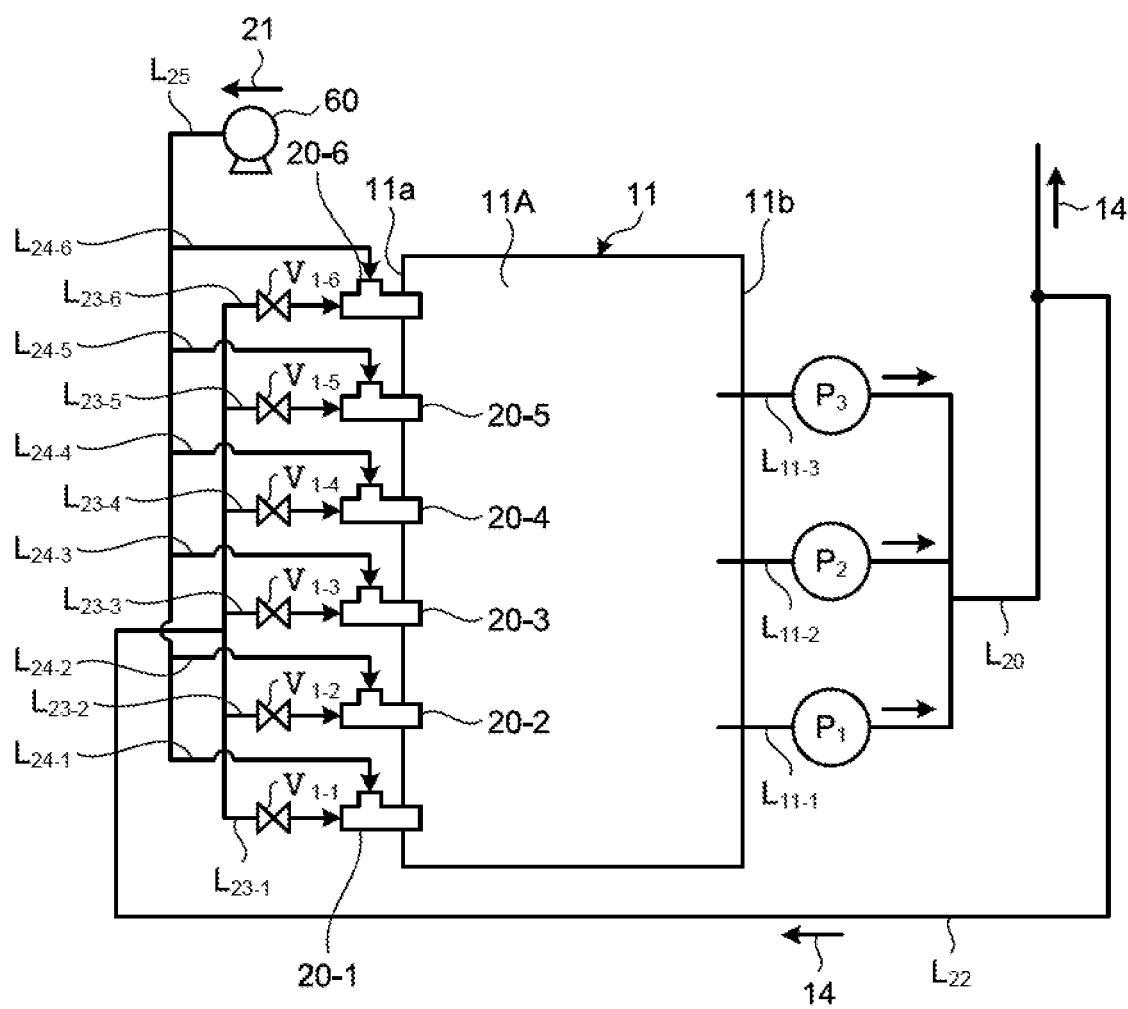
FIG. 9 is a plane schematic diagram of a circulation line system for absorbent in another wet flue gas desulfurization apparatus according to the first embodiment.

FIG. 9 is a plane schematic diagram of a circulation line system for absorbent in another wet flue gas desulfurization apparatus according to the first embodiment. The wet flue gas desulfurization apparatus illustrated in FIG. 9 includes a blower 60 in addition to the components of the desulfurization apparatus 10A. The blower 60 is arranged on a side of an air introduction end of an air introduction line $L_{2s}$. The blower 60 has a system of forcibly blowing the air (oxygen) 21 into the air introduction line $L_{25}$ from the outside when being operated, and forcibly introducing the air 21 into the water flow oxidation device 20.

The wet flue gas desulfurization apparatus illustrated in FIG. 9 causes the blower 60 to be operated to blow the air 21 into the air introduction line $L_{25}$, and supplies more air 21 to the water flow oxidation device 20. By arranging the blower 60, the amount of the air 21 introduced into the water flow oxidation device 20 can be caused to be larger than the amount of the air 21 introduced into the absorbent storage tank 11A by itself due to the contracted flow effect. Accordingly, more air 21 can be supplied to the absorbent storage tank 11A, and oxidizing ability within the absorbent storage tank 11A can be improved. When the rate of the sulfur compounds included in the flue gas 12 or the rate of the sulfur compounds in the absorbent 14 is higher than the threshold, the control device 40 increases the supply amount of the air 21 supplied from the blower 60 to the water flow oxidation device 20 to improve oxidizing ability.

In some embodiments, a plurality of circulation pumps P are arranged, and the amount of the circulating absorbent 14 is controlled by stopping the operation of some of the circulation pumps P. However, the present invention is not limited thereto. The circulation amount of the circulating absorbent 14 may be adjusted by changing an operation rate of the circulation pumps P. Alternatively, both of the number of circulation pumps P in operation and the operation rate may be changed. In a case of adjusting the operation rate of the circulation pump P, the number of circulation pumps P may be one.

In some embodiments described above, the absorbent jetting unit 15 is a jetting unit having a fountain-like manner to allow the absorbent 14 that absorbs sulfur oxides in the flue gas 12 to be jetted upward from the spray unit 15a such as a spray nozzle and jetted droplets to fall down, but the present invention is not limited thereto. For example, the present invention can be applied to a jetting unit having a spray manner to allow the absorbent 14 to directly fall down as droplets from a spray nozzle and the like.

Figure 10:
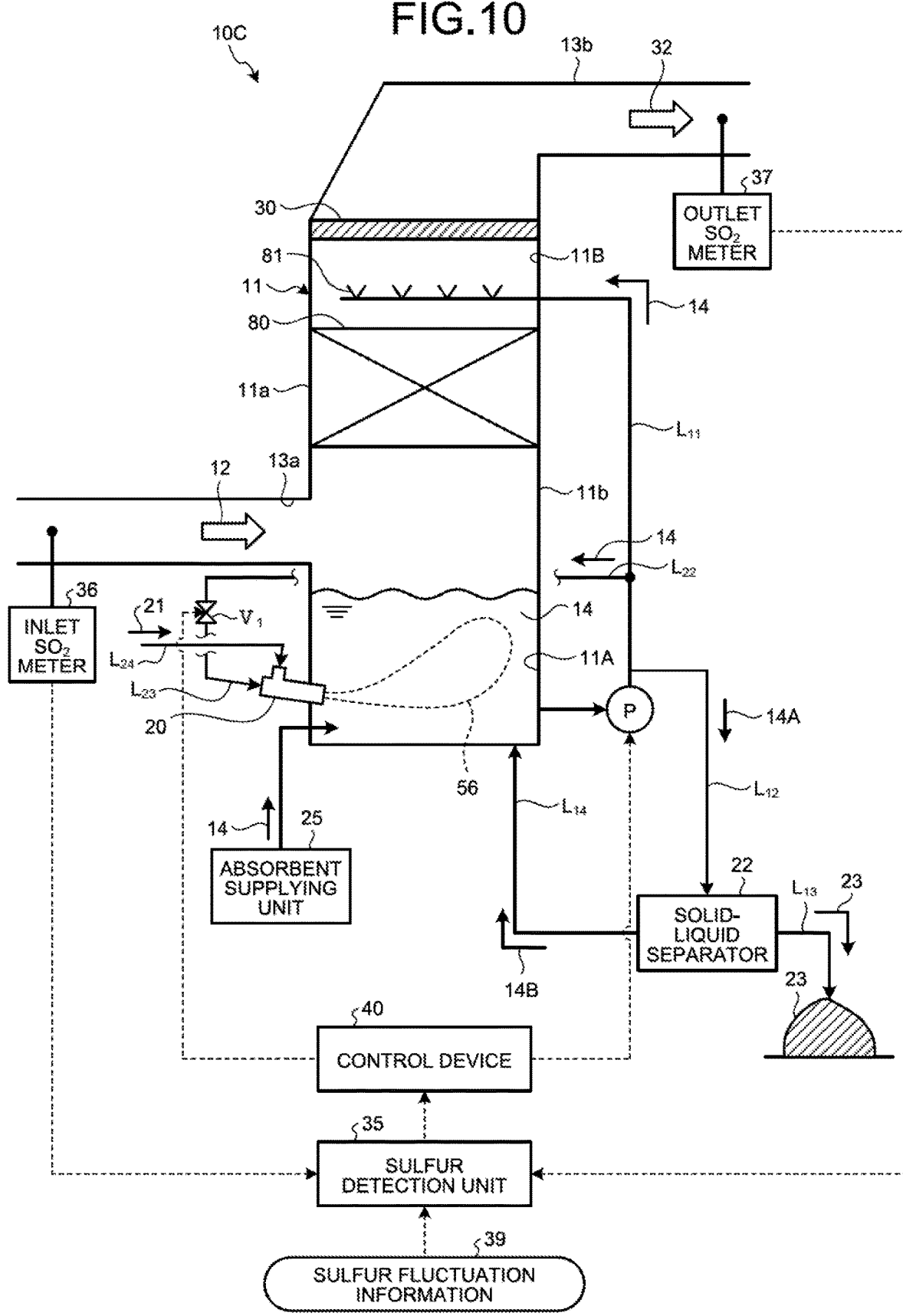
FIG. 10 is a schematic diagram illustrating another wet flue gas desulfurization apparatus according to the first embodiment.

FIG. 10 is a schematic diagram illustrating another wet flue gas desulfurization apparatus according to the first embodiment. In some embodiments, a desulfurization apparatus 10C is what is called a grid tower type including a spray unit having a filler (grid) 80 within the absorber 11 of the desulfurization apparatus 10A in place of a spray unit having a fountain-like manner therewithin. An absorbent jetting unit 81 is connected to an end of the absorbent circulation line $L_{11}$ to jet the absorbent 14. The absorbent 14 jetted from the absorbent jetting unit 81 is allowed to flow downward via the filler (grid) 80, and brought into contact with the flue gas 12 to absorb $SO_2$.

According to the present embodiment, by performing operation for changing the number of water flow oxidation devices 20 on the basis of the rate of the sulfur compounds in the absorbent 14 within the absorbent storage tank 11A of the absorber 11 of the desulfurization apparatus 10C, an oxygen excessive state is prevented and an appropriate operation state can be maintained.

The present invention is not limited to the desulfurization apparatus using the limestone-gypsum method, and can also be applied to a desulfurization apparatus having a problem of an oxygen excessive state of the absorbent 14 (for example, a seawater desulfurization apparatus).

Second Embodiment

Figure 11:
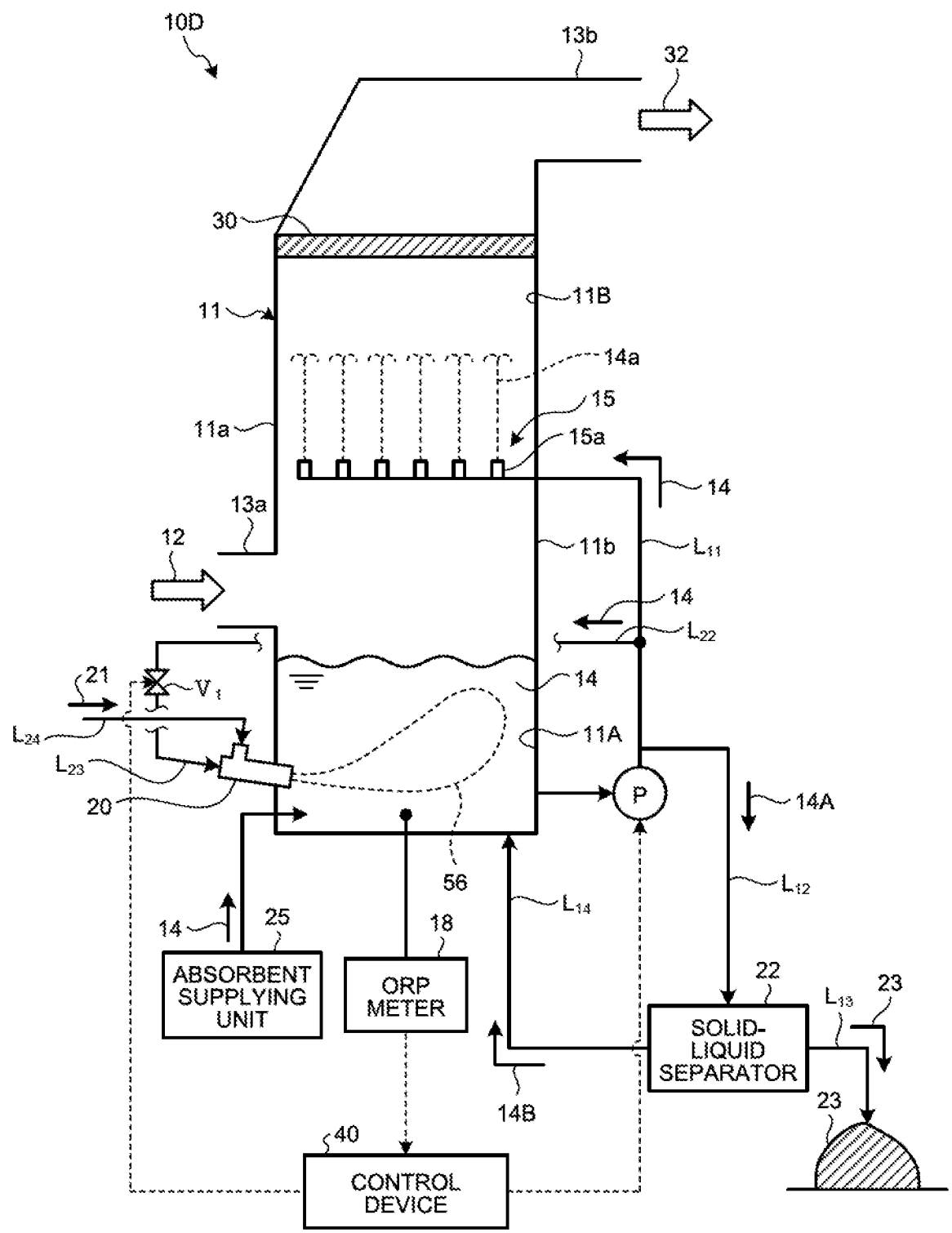
FIG. 11 is a schematic diagram illustrating a wet flue gas desulfurization apparatus according to a second embodiment.

The following describes the wet flue gas desulfurization apparatus according to a second embodiment of the present invention with reference to the drawings. FIG. 11 is a schematic diagram illustrating the wet flue gas desulfurization apparatus according to the second embodiment. The same members as those in the first embodiment are denoted by the same reference numerals, and description thereof will be omitted.

As illustrated in FIG. 11, a desulfurization apparatus 10D according to the second embodiment includes an oxidation-reduction potential (ORP) meter 18 in place of the sulfur detection unit 35 of the desulfurization apparatus 10A according to the first embodiment. The ORP meter 18 measures a value of oxidation-reduction potential (hereinafter, referred to as "ORP" in the second embodiment) within the absorbent storage tank 11A. The control device 40 of the desulfurization apparatus 10D measures the value of ORP with the ORP meter 18, and controls the number of water flow oxidation devices 20 to be operated or a jetting amount of the absorbent 14 and the air 21 from the water flow oxidation device 20 on the basis of the value of ORP. The control device 40 uses the value of ORP as a unit for obtaining a rate of sulfur components in the absorbent 14, and performs control on the basis of the value of ORP.

For example, the control device 40 switches the operation state of the water flow oxidation device 20 on the basis of whether the value of ORP is in an appropriate range. As a result of measurement with the ORP meter 18, when the value exceeds the appropriate range and it is determined that a peroxidation state (oxygen excessive state) is caused in the absorbent storage tank 11A, the water flow oxidation devices 20 are thinned out similarly to the desulfurization apparatus 10A described in the first embodiment to cause the ORP value to fall within the appropriate range. By way of example, the number of water flow oxidation devices 20 to be operated is reduced. Accordingly, the reduced operation of the water flow oxidation device 20 is performed.

The appropriate range of ORP is a range of ORP in which part of oxidized mercury ions collected in the absorbent 14 is prevented from becoming metal mercury and mercury is not scattered again, and mercury ions in the absorbent 14 is captured by the gypsum 23 and mercury ions are not accumulated in the absorbent 14. The appropriate range of ORP is determined for each plant. Typically, the appropriate range of ORP is a range equal to or higher than 50 mV and equal to or lower than 200 mV, more preferably a range equal to or higher than 50 mV and equal to or lower than 150 mV, and even more preferably a range equal to or higher than 80 mV and equal to or lower than 150 mV.

The appropriate range of ORP varies depending on each plant or an operation condition, so that the appropriate range of ORP is determined in advance at the time of test operation. The appropriate range of ORP may be changed in some cases depending on fuel supplied to the boiler or load fluctuation in a boiler operation, so that the appropriate range of ORP may be determined each time when such fluctuation occurs. In a plant operation, one optimum value of ORP is selected within the appropriate range of ORP for operation.

Reduced operation control based on the value of ORP is performed by the control device 40. The control device 40 performs reduced operation of the water flow oxidation device 20 that jets the jet flow 56 into the absorbent storage tank 11A on the basis of the value of ORP of the absorbent 14 within the absorbent storage tank 11A of the absorber 11 measured by the ORP meter 18.

Specifically, the ORP value within the absorbent storage tank 11A is measured, and if the ORP value falls within the appropriate range, the operation is continued. If the ORP value exceeds the appropriate range, the control device 40 performs reduced operation of the water flow oxidation device 20. This operation control may be automatically performed, or may be manually performed by an operator.

Figure 12A:
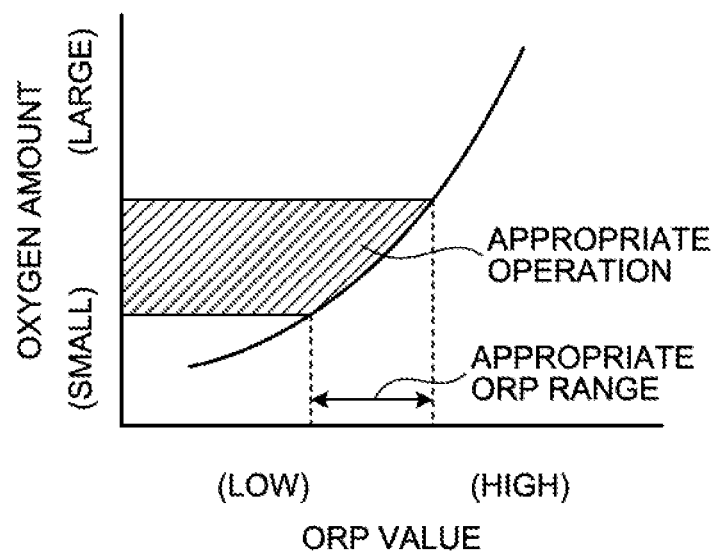
FIG. 12A is an explanatory diagram illustrating a relation between an ORP value and the number of operating water flow oxidation devices (oxygen amount).
Figure 12B:
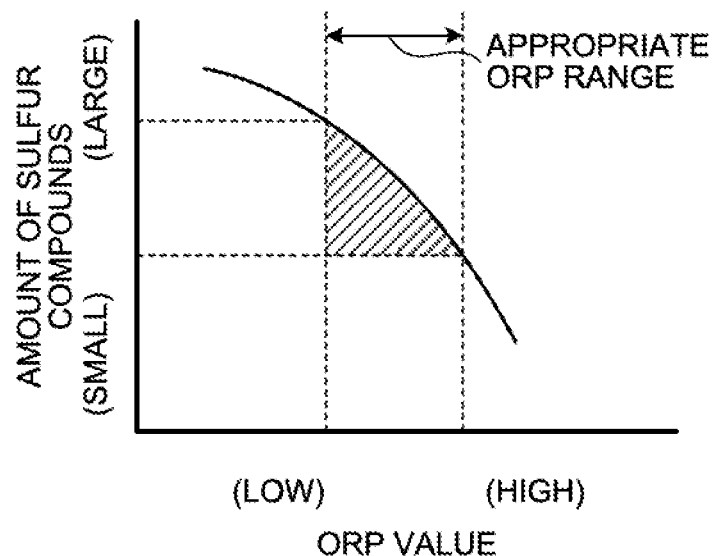
FIG. 12B is an explanatory diagram illustrating a relation between the ORP value and an amount of sulfur compounds.

FIG. 12A is an explanatory diagram illustrating a relation between the ORP value and the number of operating water flow oxidation devices (oxygen amount). FIG. 12B is an explanatory diagram illustrating a relation between the ORP value and the amount of sulfur compounds.

As illustrated in FIG. 12A, when the ORP value falls within the appropriate range, all the water flow oxidation devices 20 that are initially arranged are operated. When the ORP value is high and exceeds the appropriate range, it is determined that an oxygen excessive state is caused, and the reduced operation is performed by reducing the number of operating water flow oxidation devices. By stopping the operation of the water flow oxidation devices 20, supply of the air 21 drawn into the absorbent storage tank 11A accompanying with the absorbent 14 is stopped, an oxygen excessive state is prevented, and the appropriate operation state is maintained. When the ORP value exceeds the appropriate range, the rate of sulfur compounds is low as illustrated in FIG. 12B, so that the control device 40 performs reduced operation of the water flow oxidation device 20. Accordingly, an oxygen excessive state is prevented and the appropriate operation state is maintained.

In this way, in the reduced operation, the ORP value obtained by the ORP meter 18 is feedback-controlled, the circulation pump P and the opening/closing valve $V_1$ are gradually controlled by the control device 40, supply of the air 21 into the absorbent storage tank 11A is stopped, and an oxygen excessive state is prevented.

Additionally, when the control device 40 performs cascade control combining the feedforward control with the boiler load and the feedback control with the ORP value, the valves $V_{1-1}$ to $V_{1-6}$ can be gradually controlled.

As illustrated in FIG. 9, in a case of forcibly introducing the air with the blower 60, the following control can be further performed by the control device 40.

First, in adjusting the supply amount of the absorbent 14 supplied to the water flow oxidation device 20, if sulfur compounds are equal to or lower than a threshold, the control device 40 performs reduced operation to reduce the supply amounts of the absorbent 14 and the air 21. In a case in which it is determined that the sulfur components are equal to or lower than the threshold, air supply is reduced and the operation is continued, and it is determined that a peroxidation state in which the ORP in the absorbent 14 is higher than the threshold is caused as a result of measurement of the ORP in the absorbent 14 with the ORP meter 18, control is performed for reducing the supply amount of the air 21 supplied from the blower 60 to the water flow oxidation device 20. Accordingly, an oxygen supply amount in the reduced operation can be further corrected.

On the other hand, in a case in which the sulfur detection unit 35 determines that the rate of sulfur compounds is equal to or lower than the predetermined value, an oxygen deficient state can be checked online when the ORP value in the absorbent 14 becomes lower than the threshold by measuring the ORP value in the absorbent 14 using the ORP 18 as a result of fluctuation in the operation condition thereafter. In this case, to forcibly compensate for the air amount reduced by the reduced operation, the blower 60 is operated to forcibly increase the introduction amount of the air 21, and the ORP value can be caused to fall within the appropriate range.

Third Embodiment

Figure 14:
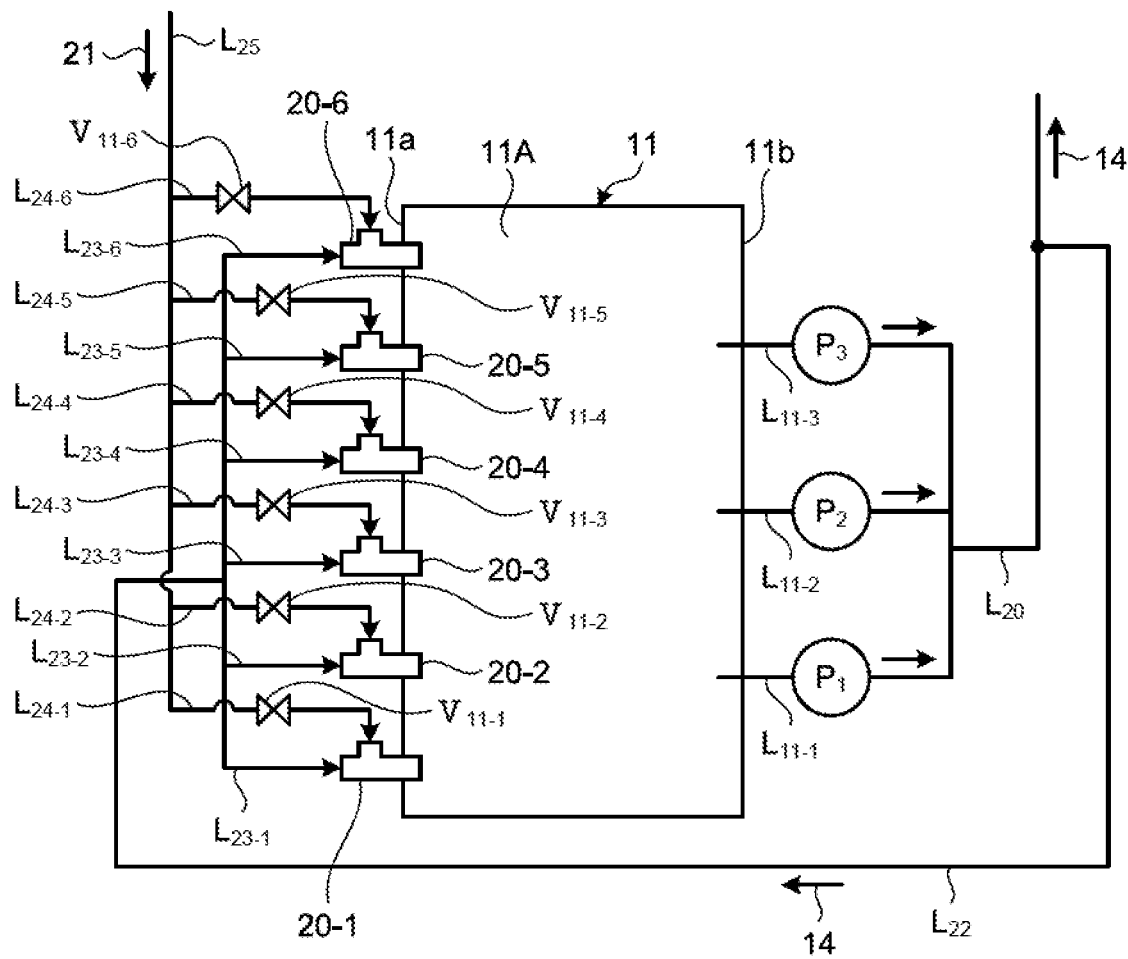
FIG. 14 is a plane schematic diagram of a circulation line system for absorbent according to the third embodiment.

The following describes the wet flue gas desulfurization apparatus according to a third embodiment of the present invention with reference to the drawings. FIG. 13 is a schematic diagram illustrating the wet flue gas desulfurization apparatus according to the third embodiment. FIG. 14 is a plane schematic diagram of the circulation line system for absorbent according to the third embodiment. The same members as the constituent members of the wet desulfurization apparatuses 10A and 10B according to the first embodiment and the second embodiment are denoted by the same reference numerals, and description thereof will be omitted. In the first embodiment and the second embodiment, the amount of the air 21 introduced into the absorbent storage tank 11A is reduced and the absorbent storage tank 11A is prevented from being in an oxygen excessive state by controlling the circulation amount of the absorbent supplied to the water flow oxidation device 20 and the number of water flow oxidation devices 20 in operation. In the present embodiment, the amount of the air 21 introduced into the absorbent storage tank 11A is reduced by adjusting the air supply amount while keeping the circulation amount of the absorbent supplied to the water flow oxidation device constant.

As illustrated in FIG. 13, a desulfurization apparatus 10E according to the third embodiment is obtained by arranging an air valve $V_{11}$ for adjusting the introduction amount of the air 21 between the control device 40 and the air supply line $L_{24}$ in the desulfurization apparatus 10A according to the first embodiment. Adjustment of the absorbent 14 by the control device 40 controlled in the first embodiment is not performed.

As illustrated in FIG. 14, an air introduction line system includes the air supply line $L_{25}$ that introduces the air 21 from the outside, and air supply lines $L_{24}$ ($L_{24-1}$ to $L_{24-6}$) each branched from the air supply line $L_{24}$ to supply the air 21 to the water flow oxidation device 20. The air supply lines $L_{24}$ ($L_{24-1}$ to $L_{24-6}$) respectively include the air valves $V_{11}$ ($V_{11-1}$ to $V_{11-6}$) for switching ON/OFF of introduction of the air 21. The number of air supply lines $L_{24}$ and the number of air valves $V_{11}$ are not limited.

When the rate of sulfur compounds in the absorbent 14 within the absorbent storage tank 11A is lower than a predetermined threshold set in advance, the control device 40 closes some air valves (for example, $V_{11-1}$, $V_{11-3}$, and $V_{11-5}$) among a plurality of air valves $V_{11}$ to reduce a total supply amount of the air 21 supplied to the water flow oxidation device 20. In this case, according to the present embodiment, the operations of the three circulation pumps P ($P_1$ to $P_3$) for circulating the absorbent 14 are not changed, and the circulation amount of the absorbent 14 from the absorbent supply line $L_{22}$ to the water flow oxidation device 20 is kept constant.

In the first embodiment and the second embodiment described above, the control device 40 adjusts the operations of the pumps P ($P_1$ to $P_3$) or reduces the number of water flow oxidation devices 20 to be operated on the basis of the rate of sulfur compounds (S-containing compounds) in the absorbent 14 obtained by the sulfur detection unit 35. In the present embodiment, the control device 40 does not control the operations of the pumps P ($P_1$ to $P_3$) and the number of water flow oxidation devices 20 to be operated, and controls opening/closing of a flow channel of the air drawn into the water flow oxidation device 20 by itself on the basis of the rate of sulfur compounds (S-containing compounds) in the absorbent 14 obtained by the sulfur detection unit 35.

For example, when the rate of sulfur compounds in the absorbent 14 is lower than the predetermined threshold set in advance (an amount of sulfite ions is low), the control device 40 closes some of the air valves $V_{11}$ ($V_{11-1}$ to $V_{11-6}$), that is, performs control for not using some of the air valves $V_{11}$ ($V_{11-1}$ to $V_{11-6}$). As a result, when the absorbent 14 is jetted from the water flow oxidation device 20, accompanying of the air 21 that is drawn in due to the contracted flow effect is prevented in the water flow oxidation device 20 in which some of the $V_{11}$ ($V_{11-1}$ to $V_{11-6}$) are closed. However, the jetting amount of the absorbent 14 from the water flow oxidation device 20 is not reduced, so that stirring efficiency is not deteriorated. Accordingly, the amount of the air 21 introduced in accordance with jetting of the absorbent 14 can be adjusted while maintaining the number of the water flow oxidation devices 20 in operation.

Figure 19:
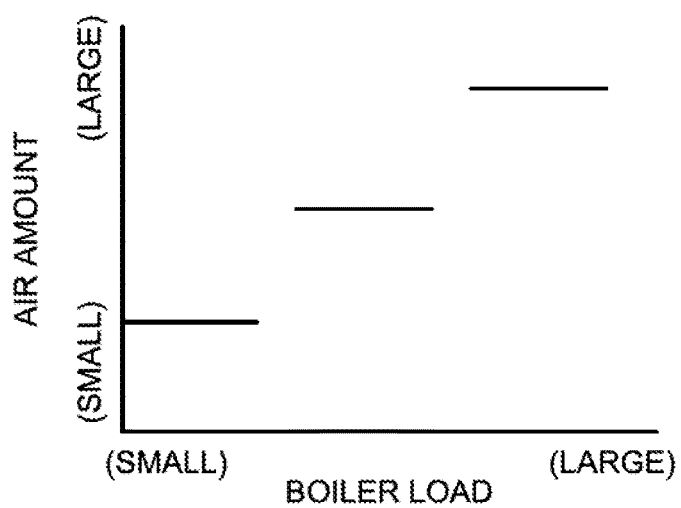
FIG. 19 is a graph obtained by adjusting a boiler load and an amount of air.

FIG. 19 is a graph obtained by adjusting the boiler load and the amount of air. As illustrated in FIG. 19, the air 21 is adjusted to be changed depending on the sulfur fluctuation information 39 such as the boiler load. That is, for example, when the boiler load is large, the amount of the air cannot be reduced, so that the air valves $V_{11}$ ($V_{11-1}$ to $V_{11-6}$) in the air supply line $L_{24}$ are not closed, but when the boiler load is small, the amount of the air is reduced by closing some of the valves $V_{11}$ ($V_{11-1}$ to $V_{11-6}$).

FIG. 20 illustrates an example of operation for reducing air introduction. FIG. 20 is a diagram illustrating an opening/closing state of the air valve in the normal operation and the reduced operation with the boiler load. As illustrated in FIG. 20, in a case of the planned operation (100% load operation), the first to the sixth air valves $V_{11-1}$ to $V_{11-6}$ are fully opened. On the other hand, in a case of the low load operation (1), the second, the fourth, and the sixth air valves $V_{11-2}$, $V_{11-4}$, and $V_{11-6}$ are closed, and introduction of the air 21 into the second, the fourth, and the sixth water flow oxidation devices 20-2, 20-4, and 20-6 is stopped. The number of the operating circulation pumps P ($P_1$ to $P_3$) is three and all of the water flow oxidation devices 20 are operated, so that power of the jet flow 56 is not reduced.

In this case, it is preferable that the second, the fourth, and the sixth air valves $V_{11-2}$, $V_{11-4}$, and $V_{11-6}$ are gradually closed. Accordingly, significant fluctuation in reduction of the air can be prevented.

By performing such a reduced operation, supply of the air 21 supplied from the second, the fourth, and the sixth water flow oxidation devices 20-2, 20-4, and 20-6 into the absorbent storage tank 11A is stopped. However, the operation is a low load operation and the concentration of sulfite ions in the absorbent 14 within the absorbent storage tank 11A is low, so that the amount of the air to oxidize the sulfite ions into sulfate ions can be reduced, and as a result, the absorbent storage tank 11A is prevented from being in the peroxidation state.

As an example of the reduced operation of the air to the water flow oxidation device 20, it is preferable to close the second, the fourth, and the sixth air valves $V_{11-2}$, $V_{11-4}$, and $V_{11-5}$ having an even number among a plurality of valves, and open the first, the third, and the fifth air valves $V_{11-1}$, $V_{11-3}$, and $V_{11-5}$ having an odd number to perform operation and stoppage at regular intervals. This is because, for example, when an unbalanced reduced operation is performed such that the first, the second, and the third air valves $V_{11-1}$, $V_{11-2}$, and $V_{11-3}$ are closed and the fourth, the fifth, and the sixth air valves $V_{11-4}$, $V_{11-5}$, and $V_{11-6}$ are opened, the air 21 jetted into the absorbent storage tank 11A is unevenly distributed, an oxidation effect is unevenly exhibited, and oxidation is insufficiently performed.

The number of air valves $V_{11}$ to be closed to reduce the air 21 is appropriately changed depending on the concentration of sulfite ions to be processed.

In this way, the control device 40 preferably performs feedforward control, specifically, feedforward control for the air valves $V_{11}$ ($V_{11-1}$ to $V_{11-6}$) on the basis of the operation condition of the combustor such as the boiler load. The reduced operation is performed by setting F(x) with the sulfur fluctuation information 39 such as the boiler load as feedforward to be able to perform control for gradually closing the air valves $V_{11}$.

For example, as illustrated in FIG. 20 as the low load operation (2), the second, the fourth, and the sixth air valves $V_{11-2}$, $V_{11-4}$, and $V_{11-6}$ are used as adjusting valves, a degree of opening of the adjusting valves is adjusted by the control device 40 to be closed by 50% (half-opened by 50%), and 50% of the introduction amount of the air 21 to the second, the fourth, and the sixth water flow oxidation devices 20-2, 20-4, and 20-6 is stopped. When the degree of opening is adjusted by 50%, a drawn-in amount of the air 21 introduced into the second, the fourth, and the sixth water flow oxidation devices 20-2, 20-4, and 20-6 is reduced, so that power of the jet flow 56 is not changed and the amount of air is reduced by half. Accordingly, a peroxidation state can be prevented.

In the embodiment described above, the air valves $V_{11-1}$ to $V_{11-6}$ are controlled to adjust introduction of the air being used as the ON/OFF valves, but the present invention is not limited thereto. In place of using the ON/OFF valve, an adjusting valve may be used to be able to adjust the degree of opening of the air valve $V_{11}$ by a predetermined amount.

FIG. 21 is a graph obtained by adjusting the boiler load and the amount of the air using an air adjusting valve. When supply of the air 21 is adjusted with the adjusting valve, the flow rate of the air can be linearly controlled in accordance with the boiler load differently from gradual adjustment as illustrated in FIG. 19.

Arrangement of Blower

Figure 15:
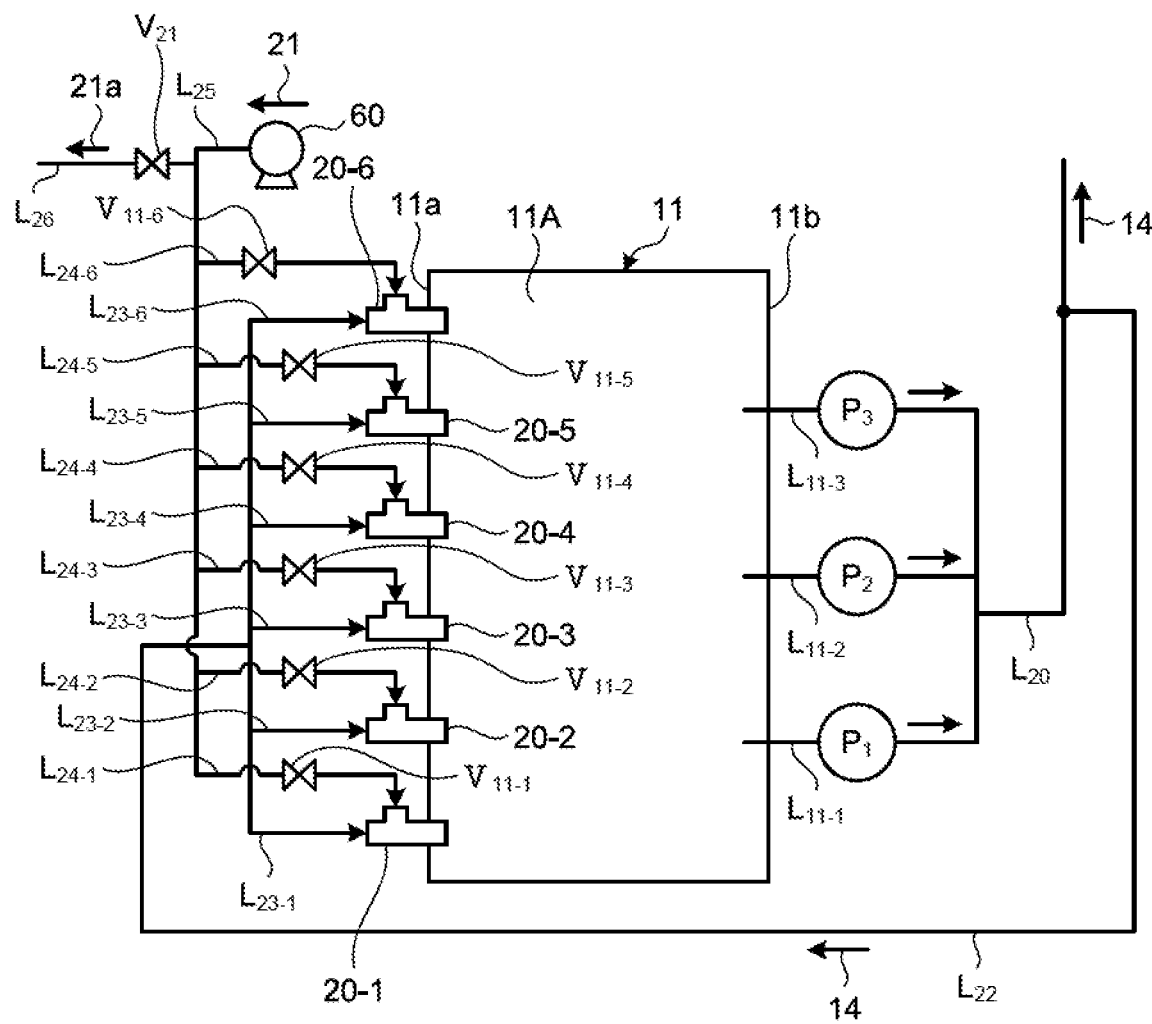
FIG. 15 is a plane schematic diagram of a circulation line system for absorbent in another wet flue gas desulfurization apparatus according to the third embodiment.

FIG. 15 is a plane schematic diagram of a circulation line system for absorbent in another wet flue gas desulfurization apparatus according to the third embodiment. The wet flue gas desulfurization apparatus illustrated in FIG. 15 includes the blower 60 in addition to the components of the desulfurization apparatus 10E. The blower 60 is arranged on a side of an air introduction end of the air introduction line $L_{25}$. The blower 60 has a system of forcibly blowing the air (oxygen) 21 into the air introduction line $L_{25}$ from the outside when being operated, and forcibly introducing the air 21 into the water flow oxidation device 20.

A blow-off line $L_{26}$ that forcibly release 21a the air 21 is connected to the air introduction line $L_{25}$ between the blower 60 and the air supply line $L_{24-6}$ close to the blower 60. A blow-off valve $V_{21}$ that controls ON/OFF for release 21a of the air 21 is arranged in the blow-off line $L_{26}$.

The wet flue gas desulfurization apparatus illustrated in FIG. 15 causes the blower 60 to be operated to forcibly blow the air 21 into the air introduction line $L_{25}$s and supplies more air 21 to the water flow oxidation device 20. By arranging the blower 60, the amount of the air 21 introduced into the water flow oxidation device 20 can be caused to be larger than the amount of the air 21 that is introduced into the absorbent storage tank 11A by itself due to the contracted flow effect. Accordingly, more air 21 can be supplied to the absorbent storage tank 11A, and oxidizing ability within the absorbent storage tank 11A can be improved.

The present embodiment is different from the desulfurization apparatus 10E illustrated in FIG. 14 in that the control device 40 adjusts the supply amount of the air that is forcibly supplied to the water flow oxidation device 20 by the blower 60 on the basis of the rate of sulfur compounds (S-containing compounds) in the absorbent 14 obtained by the sulfur detection unit 35. The air can be adjusted such that the supply amount of the air supplied to the water flow oxidation device 20 can be suppressed by adjusting the degree of opening of the blow-off valve $V_{21}$.

That is, for example, when the rate of sulfur compounds in the absorbent 14 is lower than the predetermined threshold set in advance (when the amount of sulfite ions is low), the control device 40 can suppress the supply amount of the air supplied to the water flow oxidation device 20 by adjusting the degree of opening of the blow-off valve $V_{21}$.

As a result, a total supply amount of the air is reduced when the absorbent 14 is jetted from the water flow oxidation device 20, so that the amount of the air 21 in the absorbent 14 jetted from the water flow oxidation device 20 is reduced. However, the jetting amount of the absorbent 14 from the water flow oxidation device 20 is constant and is not reduced, so that stirring efficiency is not deteriorated due to the absorbent 14. Accordingly, the amount of the air 21 forcibly introduced from the blower 60 in accordance with jetting of the absorbent 14 can be adjusted while maintaining the number of the water flow oxidation devices 20 in operation.

Along with the adjustment of the blow-off valve $V_{21}$, control may be performed for closing some of the air valves $V_{11}$ ($V_{11-1}$ to $V_{11-6}$), that is, not using some of the air valves $V_{11}$ ($V_{11-1}$ to $V_{11-6}$). As a result, when the absorbent 14 is jetted from the water flow oxidation device 20, the air 21 accompanying with the absorbent 14 is not introduced from the water flow oxidation device 20 in which some of the air valves $V_{11}$ ($V_{11-1}$ to $V_{11-6}$) are closed. However, the jetting amount of the absorbent 14 from the water flow oxidation device 20 is not reduced, so that stirring efficiency is not deteriorated. Accordingly, the amount of the air 21 introduced in accordance with jetting of the absorbent 14 can be adjusted while maintaining the number of the water flow oxidation devices 20 in operation.

Instead of adjusting the blow-off valve $V_{21}$ and forcibly releasing the air 21 from the blow-off line $L_{26}$, the operation load of the blower 60 may be changed to adjust the amount of the air supplied to the water flow oxidation device 20.

Fourth Embodiment

Figure 16:
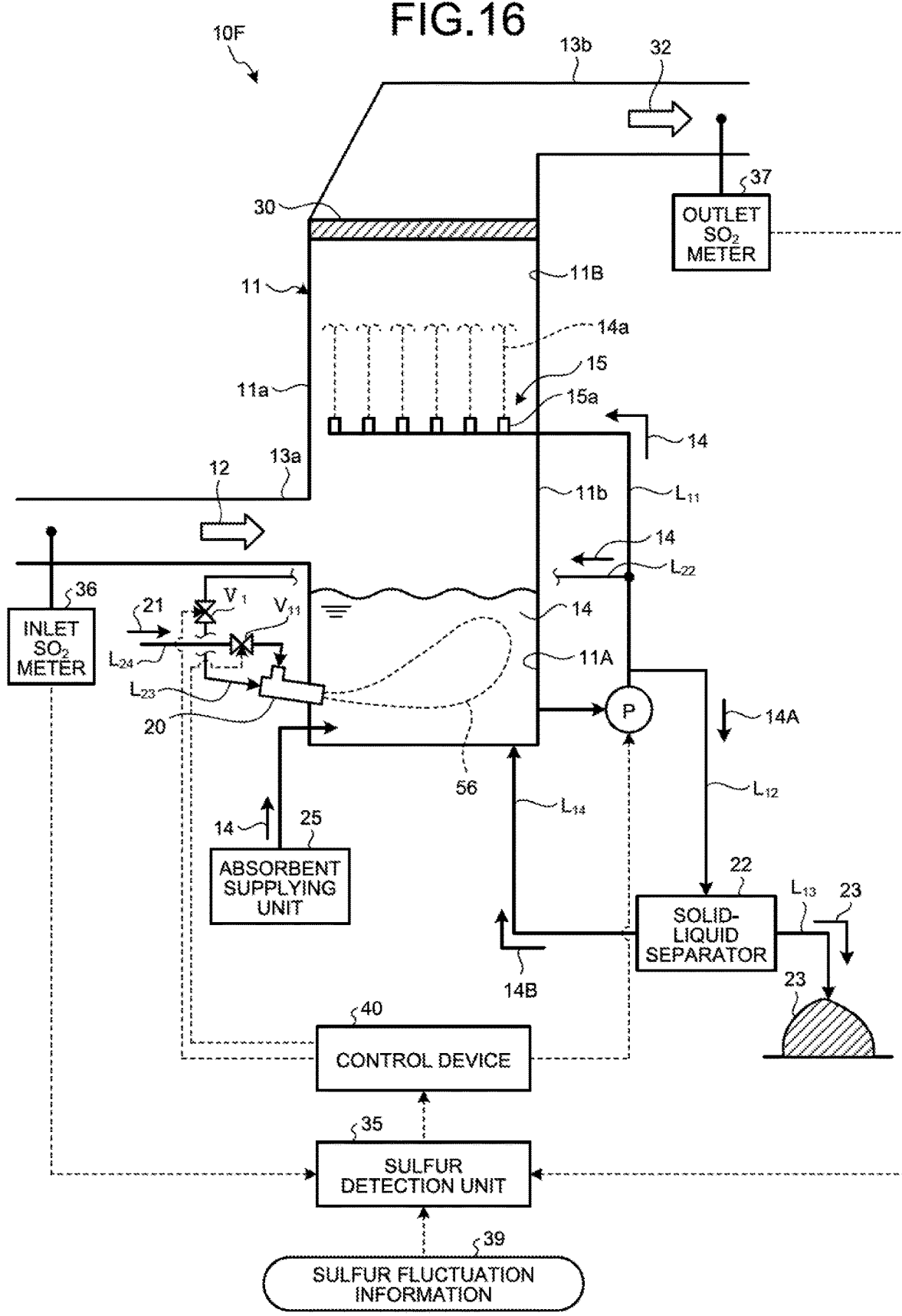
FIG. 16 is a schematic diagram illustrating a wet flue gas desulfurization apparatus according to a fourth embodiment.
Figure 17:
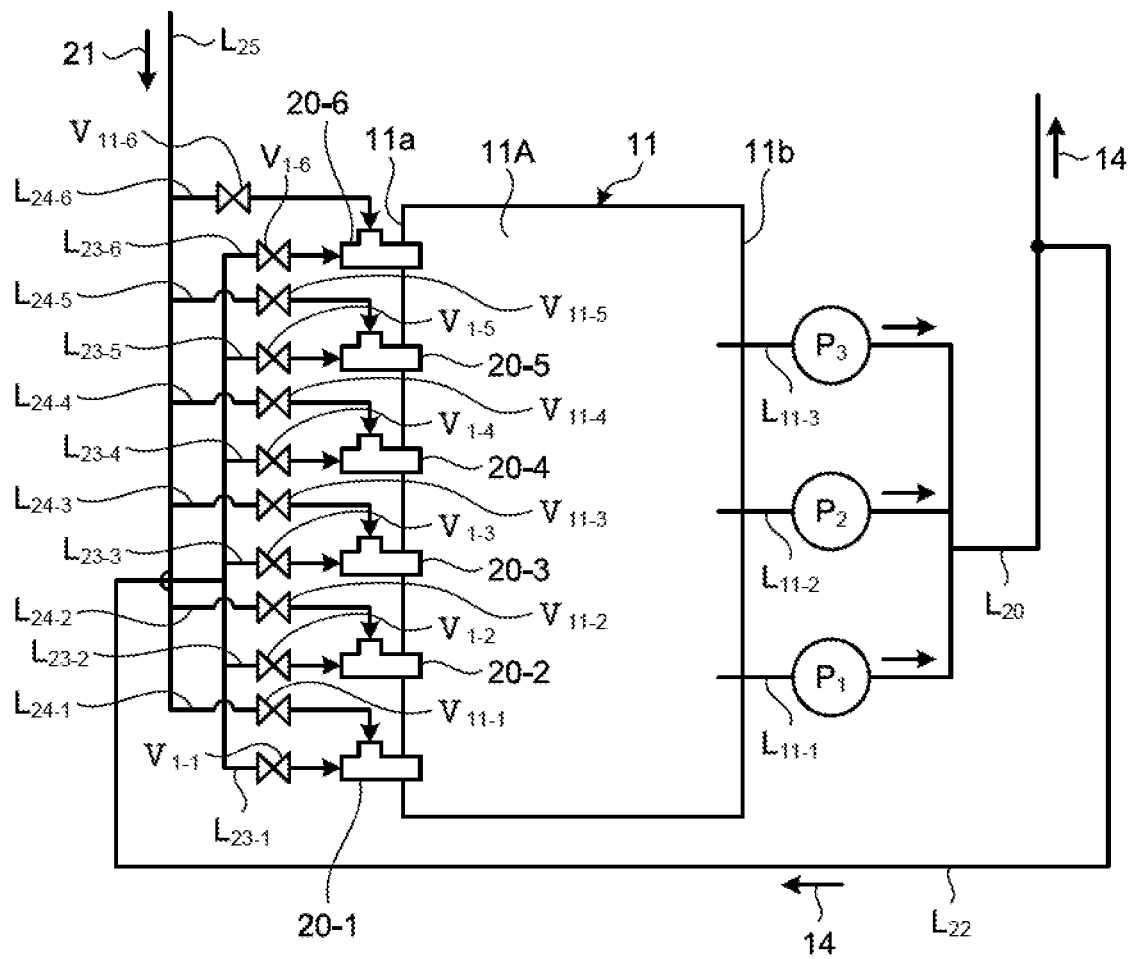
FIG. 17 is a plane schematic diagram of a circulation line system for absorbent in the wet flue gas desulfurization apparatus according to the fourth embodiment.

The following describes the wet flue gas desulfurization apparatus according to a fourth embodiment of the present invention with reference to the drawings. FIG. 16 is a schematic diagram illustrating the wet flue gas desulfurization apparatus according to the fourth embodiment. FIG. 17 is a plane schematic diagram of a circulation line system for absorbent in the wet flue gas desulfurization apparatus according to the fourth embodiment.

The same members as the constituent members of the wet desulfurization apparatus according to the first embodiment, the second embodiment, and the third embodiment are denoted by the same reference numerals, and description thereof will be omitted. The desulfurization apparatus 10E according to the third embodiment reduces the amount of the air 21 introduced into the absorbent storage tank 11A by adjusting the air supply amount while keeping the circulation amount of the absorbent supplied to the water flow oxidation device constant. In the present embodiment, the jetting amount of the absorbent and the amount of the air are both adjusted.

As illustrated in FIG. 16, the desulfurization apparatus 10F according to the fourth embodiment is obtained by arranging the air valve $V_{11}$ for adjusting the introduction amount of the air 21 between the control device 40 and the air supply line $L_{24}$ in the desulfurization apparatus 10A according to the first embodiment.

The desulfurization apparatus 10F according to the present embodiment uses adjustment for varying supply of the air 21 to the water flow oxidation device 20 in addition to any one or both of adjustment for reducing the jetting amount of the absorbent 14 into the absorbent storage tank 11A by reducing the operations of a plurality of water flow oxidation devices 20 performed by the control device 40 on the basis of the rate of sulfur compounds (S-containing compounds) in the absorbent 14 obtained by the sulfur detection unit 35 as in the first embodiment, and adjustment for reducing the jetting amount into the absorbent storage tank 11A by adjusting the supply amount of the absorbent 14 supplied to the water flow oxidation device 20 with a pump or a valve while continuing the operations of the water flow oxidation devices 20. In this case, as described in the third embodiment, ON/OFF adjustment of the air valve $V_{11}$ and optional adjustment using the air valve $V_{11}$ as the adjusting valve are performed to change the amount of the air to the water flow oxidation device 20.

As an example of the reduced operation, as illustrated in FIG. 22A, the first to the sixth opening/closing valves $V_{1-1}$ to $V_{1-6}$ for supplying the absorbent 14 are fully opened in a case of the planned operation (100% load operation). On the other hand, in a case of the low load operation (1), the second, the fourth, and the sixth opening/closing valves $V_{1-2}$, $V_{1-4}$, and $V_{1-6}$ are closed, and introduction of the absorbent 14 into the second, the fourth, and the sixth water flow oxidation devices 20-2, 20-4, and 20-6 is stopped. Even when the circulation amount of the absorbent 14 is reduced because the number of the circulation pumps P ($P_1$ to $P_3$) in operation is changed from three to two, the reduced operation is performed by operating the first, the third, and the fifth water flow oxidation devices 20-1, 20-3, and 20-5, so that power of the jet flow 56 is not reduced.

By performing the reduced operation, as illustrated in FIG. 22B, introduction of the air 21 is stopped in accordance with stoppage of the second, the fourth, and the sixth water flow oxidation devices 20-2, 20-4, and 20-6, and the air 21 is supplied only from the first, the third, and the fifth water flow oxidation devices 20-1, 20-3, and 20-5. Accordingly, the entire air supply amount is reduced. However, the operation of the boiler is a low load operation and the concentration of sulfite ions in the absorbent 14 within the absorbent storage tank 11A is low, so that the amount of the air to oxidize sulfite ions into sulfate ions can be reduced. As a result, in a case in which the operation of the boiler is a low load operation, introduction of the air 21 is controlled, the absorbent storage tank 11A is prevented from being in a peroxidation state, and an appropriate operation state can be maintained.

The following describes, as a low load operation (3), a case in which the reduced operation is performed by operating the first, the third, and the fifth water flow oxidation devices 20-1, 20-3, and 20-5, and the operation is a low load operation. FIG. 22A is a diagram illustrating an opening/closing state of the opening/closing valve in the normal operation and the reduced operation with the boiler load, and FIG. 22B is a diagram illustrating an opening/closing state of the air valve in the normal operation and the reduced operation with the boiler load.

In a case of the low load operation (1), as illustrated in FIG. 22A, the air 21 is introduced from the air supply lines $L_{24\text{-}1}$, $L_{24\text{-}3}$, and $L_{24\text{-}5}$. In a case of the low load operation (3), as illustrated in FIG. 22B, the introduction amount of the air 21 can be further reduced by closing the third air valve $V_{11\text{-}3}$.

In a case in which, even when supply of oxygen is reduced in a state of the low load operation (1), and oxygen is excessive by being sufficiently present, then the oxygen excessive state can be solved by adjusting the air amount through the operation such as the low load operation (3).

Figure 18:
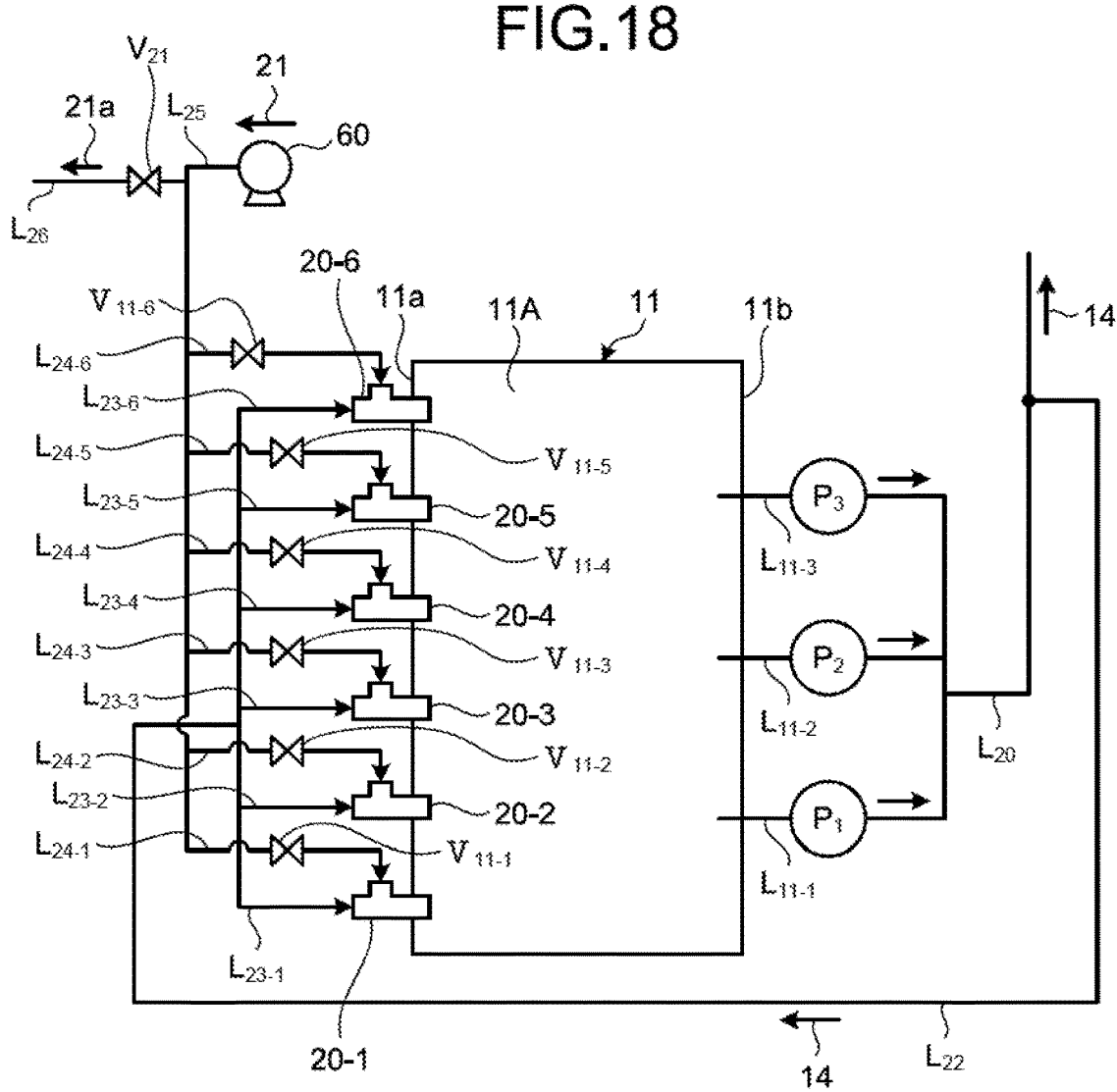
FIG. 18 is a plane schematic diagram of a circulation line system for absorbent in another wet flue gas desulfurization apparatus according to the fourth embodiment.

FIG. 18 is a plane schematic diagram of a circulation line system for absorbent in another wet flue gas desulfurization apparatus according to the fourth embodiment. The wet flue gas desulfurization apparatus illustrated in FIG. 18 includes the blower 60 in addition to the components of the desulfurization apparatus 10F. The blower 60 is arranged on a side of the air introduction end of an air introduction line $L_{25}$. The blower 60 has a system of forcibly blowing the air (oxygen) 21 into the air introduction line $L_{25}$ from the outside when being operated, and forcibly introducing the air 21 into the water flow oxidation device 20. In a case of a forcing type including the blower 60, as illustrated in FIG. 18, the blow-off valve $V_{21}$ is adjusted or the air valves $V_{11}$ are individually adjusted in addition to adjustment of the absorbent 14.

In this case, by adjusting a ratio (flow rate ratio) between the jetting amount of the absorbent 14 from the water flow oxidation device 20 and the supply amount of the air 21 supplied to the water flow oxidation device 20 in changing the jetting amount and the supply amount in accordance with the sulfur fluctuation information 39 such as the boiler load, appropriate desulfurization performance corresponding to the boiler load can be maintained.

REFERENCE SIGNS LIST 10A, 10B, 10C, 10D, 10E, 10F Wet flue gas desulfurization apparatus (desulfurization apparatus)
11 Absorber
11a, 11b Side wall
11A Absorbent storage tank
11B Flue gas passage
12 Flue gas
13a Gas introduction unit
13b Gas discharging unit
14 Absorbent
14a Jetted liquid
15 Absorbent jetting unit
15a Spray unit
18 ORP meter
20 Water flow oxidation device
21 Air
22 Solid-liquid separator
23 Gypsum
25 Absorbent supplying unit
35 Sulfur detection unit
39 Sulfur fluctuation information
$L_{11}$ Absorbent circulation line
$L_{12}$ Desulfurization wastewater discharging line
$L_{22}$ Absorbent supply line
$L_{24}$ Air supply line
P ($P_1$ to $P_3$) Circulation pump
$V_1$ ($V_{1\text{-}1}$ to $V_{1\text{-}6}$) Opening/closing valve
$V_{11}$ ($V_{11\text{-}1}$ to $V_{11\text{-}6}$) Air valve

The invention claimed is:

1. A wet flue gas desulfurization apparatus comprising:
an absorber that includes an absorbent storage tank for storing absorbent and a flue gas passage through which flue gas discharged from a combustor passes, the absorber being configured to bring the flue gas into contact with the absorbent to cause the absorbent to absorb a sulfur oxide included in the flue gas;
a gas introduction unit that is arranged on an upper side wall of the absorber, and that is configured to introduce the flue gas into the absorber;
an absorbent jetting unit that is arranged in the flue gas passage, and that is configured to jet the absorbent into a space of the absorber;
an absorbent circulation line that is configured to supply the absorbent to the absorbent jetting unit from the absorbent storage tank;
a plurality of water flow oxidation devices that are configured to jet part of the absorbent branched and introduced from the absorbent circulation line into an inside of the absorbent storage tank together with air; and
a control device that is configured to execute for adjusting any one or both of a jetting amount of the absorbent jetted from the water flow oxidation devices and a supply amount of the air supplied to the water flow oxidation devices based on any one or both of a concentration of a sulfur compound included in the flue gas and a concentration of a sulfur compound in the absorbent within the absorbent storage tank,
wherein the control device is configured to execute any one or both of control for varying the number of operating water flow oxidation devices and control for varying a circulation amount of the absorbent circulated into the water flow oxidation devices, and the control device is configured to execute control for varying an amount of the air supplied to the water flow oxidation devices with a valve, and wherein the control device is configured to execute control for reducing the number of the operating water flow oxidation devices when any one or both of a concentration of a sulfur compound included in the flue gas and a concentration of a sulfur compound in the absorbent within the absorbent storage tank are lower than a predetermined threshold set in advance.

2. The wet flue gas desulfurization apparatus according to claim 1, wherein the absorbent circulation line includes a plurality of circulation pumps, and when the concentration of the sulfur compound included in the flue gas or the concentration of the sulfur compound in the absorbent within the absorbent storage tank is lower than the predetermined threshold set in advance, the control device is configured to execute control for stopping operations of some of the circulation pumps to reduce the circulation amount of the absorbent.

3. The wet flue gas desulfurization apparatus according to claim 1, comprising:

a plurality of air supply lines that are configured to supply air to the respective water flow oxidation devices; and valves that are arranged in the respective air supply lines and are configured to adjust the supply amount of the air, wherein when the concentration of the sulfur compound included in the flue gas or the concentration of the sulfur compound in the absorbent within the absorbent storage tank is lower than the predetermined threshold set in advance, the control device is configured to execute control for closing some of the valves or adjusting a degree of opening of the valves to reduce the amount of the air supplied to the water flow oxidation device.

4. The wet flue gas desulfurization apparatus according to claim 1, wherein the water flow oxidation device comprises:

a connection part connected to an absorbent branch line that branches part of the absorbent from the absorbent circulation line;

a liquid supply passage that communicates with the connection part and includes a flow channel narrow part formed inside that is narrower than the liquid supply passage; and an air supply passage having an opening in a downstream area of the flow channel narrow part within the liquid supply passage.

5. The wet flue gas desulfurization apparatus according to claim 1, wherein, in reducing the number of the operating water flow oxidation devices, the control device is configured to stop the operations of any of the water flow oxidation devices at intervals of every predetermined number in an arrangement direction of the water flow oxidation devices.

6. The wet flue gas desulfurization apparatus according to claim 1, comprising:

an oxidation-reduction potential meter that is configured to measure oxidation reduction potential within the absorbent storage tank, wherein the control device is configured to obtain the concentration of the sulfur compound in the absorbent within the absorbent storage tank based on a measured value of the oxidation-reduction potential measured with the oxidation-reduction potential meter.

7. The wet flue gas desulfurization apparatus according to claim 1, wherein the control device is configured to execute for adjusting any one or both of the jetting amount of the absorbent jetted from the water flow oxidation devices and the supply amount of the air supplied to the water flow oxidation devices based on at least one of values of a boiler load, inlet $SO_2$ concentration, outlet $SO_2$ concentration, and a desulfurization ratio, and the concentration of the sulfur compound in the absorbent within the absorbent storage tank.

8. The wet flue gas desulfurization apparatus according to claim 1, comprising:

a stirring device within the absorbent storage tank, wherein the stirring device is started/stopped by the control device.

9. The wet flue gas desulfurization apparatus according claim 1, comprising:

a blower that supplies the air to the water flow oxidation device, wherein, when the concentration of the sulfur compound included in the flue gas or the concentration of the sulfur compound in the absorbent is higher than the threshold, the control device is configured to increase the supply amount of the air supplied from the blower to the water flow oxidation device.

10. The wet flue gas desulfurization apparatus according to claim 1, comprising:

a blower that is configured to supply the air to the water flow oxidation device, wherein, in adjusting the supply amount of the air supplied to the water flow oxidation devices, when the concentration of the sulfur compound included in the flue gas or the concentration of the sulfur compound in the absorbent is lower than a threshold, the control device is configured to execute control for reducing the supply amount of the air supplied from the blower to the water flow oxidation devices.

* * * * *